US011141730B2

(12) United States Patent
Weitz et al.

(10) Patent No.: US 11,141,730 B2
(45) Date of Patent: Oct. 12, 2021

(54) COALESCENCE OF DROPLETS

(71) Applicant: President and Fellows of Harvard College, Cambridge, MA (US)

(72) Inventors: David A. Weitz, Bolton, MA (US); Thomas E. Kodger, Cambridge, MA (US); Donald Aubrecht, Somerville, MA (US); Ilke Akartuna, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 799 days.

(21) Appl. No.: 14/896,218

(22) PCT Filed: Jun. 12, 2014

(86) PCT No.: PCT/US2014/042034
§ 371 (c)(1),
(2) Date: Apr. 1, 2016

(87) PCT Pub. No.: WO2014/201196
PCT Pub. Date: Dec. 18, 2014

(65) Prior Publication Data
US 2016/0129444 A1    May 12, 2016

Related U.S. Application Data

(60) Provisional application No. 61/835,381, filed on Jun. 14, 2013.

(51) Int. Cl.
*B01L 3/00* (2006.01)
*B01F 5/06* (2006.01)
(Continued)

(52) U.S. Cl.
CPC ........ *B01L 3/502784* (2013.01); *B01F 5/061* (2013.01); *B01F 5/0646* (2013.01);
(Continued)

(58) Field of Classification Search
CPC ........... B01L 3/502784; B01L 2200/06; B01L 2300/0858; B01L 2300/161;
(Continued)

(56) References Cited

U.S. PATENT DOCUMENTS 7,708,949 B2    5/2010  Stone et al.
8,337,778 B2   12/2012  Stone et al.
(Continued)

FOREIGN PATENT DOCUMENTS

GB          2097692 A  * 11/1982  ................ B01F 3/08
WO   WO 2004/002627 A2   1/2004
(Continued)

OTHER PUBLICATIONS

International Search Report and Written Opinion for Application No. PCT/US2014/042034 dated Dec. 12, 2014.
(Continued)

*Primary Examiner* — Lyle Alexander
*Assistant Examiner* — Bryan Kilpatrick
(74) *Attorney, Agent, or Firm* — Wolf, Greenfield & Sacks, P.C.

(57) ABSTRACT

The present invention generally relates to microfluidics, and, in particular, to systems and methods for coalescing or fusing droplets. In certain aspects, two or more droplets within a microfluidic channel are brought together and caused to coalesce without using electric fields or charges. For example, in certain embodiments, droplets stabilized with a surfactant may be disrupted, e.g., by exposing the droplets to a solvent able to alter the surfactant, which may partially destabilize the droplets and allow them to coalesce. In some instances, the droplets may also be physically disrupted to facilitate coalesce. In addition, in some cases, the positions of one or more droplets may be controlled within a channel using a groove in a wall of the channel. For
(Continued)

example, a droplet may at least partially enter the groove such that the position of the droplet is at least partially controlled by the groove.

19 Claims, 16 Drawing Sheets

(51) Int. Cl.
*B01F 13/00* (2006.01)
*B01J 19/00* (2006.01)

(52) U.S. Cl.
CPC ....... *B01F 13/0071* (2013.01); *B01J 19/0093* (2013.01); *B01L 3/502715* (2013.01); *B01F 2005/0631* (2013.01); *B01F 2005/0636* (2013.01); *B01J 2219/009* (2013.01); *B01J 2219/0084* (2013.01); *B01J 2219/0086* (2013.01); *B01J 2219/00783* (2013.01); *B01J 2219/00826* (2013.01); *B01J 2219/00828* (2013.01); *B01J 2219/00831* (2013.01); *B01J 2219/00833* (2013.01); *B01J 2219/00855* (2013.01); *B01J 2219/00889* (2013.01); *B01J 2219/00894* (2013.01); *B01J 2219/00896* (2013.01); *B01J 2219/00903* (2013.01); *B01L 2200/06* (2013.01); *B01L 2300/0858* (2013.01); *B01L 2300/0867* (2013.01); *B01L 2300/12* (2013.01); *B01L 2300/161* (2013.01)

(58) Field of Classification Search
CPC ............ B01L 3/502715; B01F 13/0071; B01F 5/0646; B01J 2219/0084; B01J 2219/0086; B01J 2219/00889; G01N 1/10
See application file for complete search history.

(56) References Cited

U.S. PATENT DOCUMENTS

| | | | |
|---|---|---|---|
| 8,765,485 | B2 | 7/2014 | Link et al. |
| 9,038,919 | B2 | 5/2015 | Link et al. |
| 9,789,482 | B2 | 10/2017 | Link et al. |
| 9,878,325 | B2 | 1/2018 | Weitz et al. |
| 10,293,341 | B2 | 5/2019 | Link et al. |
| 10,625,256 | B2 | 4/2020 | Weitz et al. |
| 2006/0163385 | A1 | 7/2006 | Link et al. |
| 2007/0003442 | A1 | 1/2007 | Link et al. |
| 2007/0195127 | A1* | 8/2007 | Ahn ................. B01F 13/0071 347/55 |
| 2009/0131543 | A1 | 5/2009 | Weitz et al. |
| 2010/0255059 | A1 | 8/2010 | Marquez et al. |
| 2011/0000560 | A1 | 1/2011 | Miller et al. |
| 2012/0220497 | A1 | 8/2012 | Jacobson et al. |
| 2014/0305799 | A1 | 10/2014 | Link et al. |
| 2015/0283546 | A1 | 10/2015 | Link et al. |
| 2017/0361318 | A1 | 12/2017 | Weitz et al. |
| 2018/0117585 | A1 | 5/2018 | Weitz et al. |
| 2019/0184398 | A1 | 6/2019 | Weitz et al. |

FOREIGN PATENT DOCUMENTS

| | | |
|---|---|---|
| WO | WO 2004/091763 A2 | 10/2004 |
| WO | WO 2005/021151 A1 | 3/2005 |
| WO | WO 2007/089541 A2 | 8/2007 |
| WO | WO 2008/021123 A1 | 2/2008 |
| WO | WO 2009/020633 A2 | 2/2009 |
| WO | WO 2009/120254 A1 | 10/2009 |

OTHER PUBLICATIONS

International Preliminary Report on Patentability for Application No. PCT/US2014/042034 dated Dec. 23, 2015.

Agresti et al., Ultrahigh-throughput screening in drop-based microfluidics for directed evolution. Proc Natl Acad Sci U S A. Mar. 2, 2010;107(9):4004-9. doi: 10.1073/pnas.0910781107. Epub Feb. 8, 2010.
Ahn et al., Electrocoalescence of drops synchronized by size-dependent flow in microfluidic channels. Appl. Phys. Lett. Jun. 2006;88:264105.
Baret et al. Surfactants in droplet-based microfluidics. Lab Chip. Feb. 7, 2012;12(3):422-33. doi: 10.1039/c1lc20582j. Epub Oct. 20, 2011.
Bremond et al., Decompressing emulsion droplets favors coalescence. Phys Rev Lett. Jan. 18, 2008;100(2):024501. Epub Jan. 15, 2008.
Bremond et al., Exploring emulsion science with microfluidics. Soft Matter, Jun. 8, 2012, 10549-10559.
Brouzes et al., Droplet microfluidic technology for single-cell high-throughput screening. Proc Natl Acad Sci U S A. Aug. 25, 2009;106(34):14195-200. doi: 10.1073/pnas.0903542106. Epub Jul. 15, 2009.
De Vries, Foam stability: Part IV. Kinetics and activation energy of film rupture. 1958;77(4): 383-99. (The year of publication is sufficiently earlier than the effective U.S. filing date and any foreign priority date so that the particular month of publication is not in issue. See MPEP 609.04(a)).
Feng et al., Two modes of phase inversion in a drying emulsion. Soft Matter, Jan. 2013; 9; 2810-2815.
Holtze et al., Biocompatible surfactants for water-in-fluorocarbon emulsions. Lab Chip. Oct. 2008;8(10):1632-9. doi: 10.1039/b806706f. Epub Sep. 2, 2008.
Köster et al., Drop-based microfluidic devices for encapsulation of single cells. Lab Chip. Jul. 2008;8(7):1110-5. doi: 10.1039/b802941e. Epub May 23, 2008.
Leal, Flow induced coalescence of drops in a viscous fluid. Physics of Fluids. Jun. 2004;16(6):1833-51.
Lederberg, A simple method for isolating individual microbes. J Bacteriol. Aug. 1954; 68(2):258-9.
McDonald et al., Fabrication of microfluidic systems in poly(dimethylsiloxane). Electrophoresis. Jan. 2000;21(1):27-40.
Nossal et al., Antibody production by single cells. Nature. May 17, 1958;181(4620):1419-20.
Poulin et al., Adhesion of Water Droplets in Organic Solvent. Langmuir, Oct. 1998, 14 (22):6341-3.
Priest et al., Controlled electrocoalescence in microfluidics: Targeting a single lamella. Appl. Phys. Lett. Sep. 2006 89; 13410. doi: http://dx.doi.org/10.1063/1.2357039.
Rekvig et al., Molecular simulations of droplet coalescence in oil/water/surfactant systems. J Chem Phys. Oct. 7, 2007;127(13):134701.
Rotenberg et al., Determination of Surface Tension and Contact Angle from the Shapes of Axisymmetric Fluid Interfaces. Journal of Colloid and Interface Science 93(1):169-183. May 1983. DOI: 10.1016/0021-9797(83)90396-X.
Rotman, Measurement of activity of single molecules of β-d-galactosidase. Proc Natl Acad Sci U S A. Dec. 1961; 47(12): 1981-1991.
Schaerli et al., The potential of microfluidic water-in-oil droplets in experimental biology. Mol Biosyst. Dec. 2009;5(12):1392-404. doi: 10.1039/b907578j. Epub Oct. 12, 2009.
Theberge et al., Microfluidic platform for combinatorial synthesis in picolitre droplets. Lab Chip. Apr. 7, 2012;12(7):1320-6. doi: 10.1039/c2lc21019c. Epub Feb. 20, 2012.
Thiam et al., Breaking of an emulsion under an ac electric field. Phys Rev Lett. May 8, 2009;102(18):188304. Epub May 7, 2009.
Touhami et al., A modified pendant drop method for transient and dynamic interfacial tension measurement. Colloids and Surfaces A: Physicochemical and Engineering Aspects. Jul. 1996;112(1);31-41.
Wasan et al., The Role of Coalescence Phenomena and Interfacial Rheological Properties in Enhanced Oil Recovery: An Overview. Journal of Rheology 23, 181 (1979); doi: http://dx.doi.org/10.1122/1.549524.
Xia et al., Soft Lithography. Angewandte Chemie International Edition. Mar. 1998; 37(5);550-75.

(56) References Cited

OTHER PUBLICATIONS

Zagnoni et al., Electrocoalescence mechanisms of microdroplets using localized electric fields in microfluidic channels. Langmuir. Sep. 21, 2010;26(18):14443-9. doi: 10.1021/la101517t.
U.S. Appl. No. 16/285,984, filed Feb. 26, 2019, Weitz et al.
U.S. Appl. No. 16/813,106, filed Mar. 9, 2020, Weitz et al.

* cited by examiner

COALESCENCE OF DROPLETS

RELATED APPLICATIONS

This application is a national stage filing under 35 U.S.C. § 371 of International Application No. PCT/US2014/042034, filed Jun. 12, 2014, entitled "Coalescence of Droplets," which claims the benefit of U.S. Provisional Patent Application Ser. No. 61/835,381, filed Jun. 14, 2013, entitled "Coalescence of Droplets," incorporated herein by reference.

FIELD

The present invention generally relates to microfluidics, and, in particular, to systems and methods for coalescing or fusing droplets.

BACKGROUND

Emulsions are droplets of one fluid dispersed in another immiscible fluid. This dispersion is not thermodynamically stable: all droplets will eventually coalesce and the emulsion macroscopically phase separates into its constitutive fluid phases. Coalescence proceeds in three stages: droplets are forced into close contact with only a thin film of the surrounding fluid separating them, this thin film drains, and thermal fluctuations of the interface between droplets nucleate a pore allowing the droplets to merge or coalesce with one another. Droplets can be stabilized against coalescence using surfactants, molecules that have both hydrophilic and hydrophobic characteristics, that adsorb on fluid interfaces, and resist film draining, dampen out thermal fluctuations, or both. The use of surfactants in industry to stabilize droplets is ubiquitous; enabling droplet production and ensuring stability during transport and handling. However, for other applications controlled coalescence is desirable and often hindered by surfactants; the difficulty of switching between stability and instability for emulsions is important for applications such as enhanced oil recovery, phase inversion in paints, collection or analysis of biological assay samples, or microfluidic droplet microreactors.

Microfluidics is used to generate and manipulate droplets; it enables high efficiency encapsulation of, e.g., cells, viruses, enzymes, and other biological material. Microfluidic channels also are unique tools for the study of fluid dynamic processes in user-defined geometries, thus making them particularly well-suited to investigate emulsion droplet coalescence. Control of the coalescence process requires control of the film drainage rate; this process depends on factors such as the interfacial tension between the droplet and continuous phases, viscosity of the continuous phase, and electrophoretic attraction between droplets. Controlled coalescence in microfluidic devices can be achieved by hydrodynamic forcing of surfactant-free droplet interfaces or electro-coalescence of surfactant-stabilized droplets. For water-in-oil systems, modification of the interfacial tension can also be achieved via the introduction of an alcohol.

SUMMARY

The present invention generally relates to microfluidics, and, in particular, to systems and methods for coalescing or fusing droplets. The subject matter of the present invention involves, in some cases, interrelated products, alternative solutions to a particular problem, and/or a plurality of different uses of one or more systems and/or articles.

In one aspect, the present invention is generally directed to an article. According to one set of embodiments, the article comprises a first microfluidic channel; a second microfluidic channel intersecting the first microfluidic channel at a first intersection; downstream of the first intersection, a second intersection of the first microfluidic channel and third and fourth microfluidic channels, wherein the maximum distance between the third microfluidic channel and the fourth microfluidic channel is at least about 50 micrometers; and downstream of the second intersection, a third intersection of the third and fourth microfluidic channels and a fifth microfluidic channel.

In another set of embodiments, the article comprises a first microfluidic channel; a second microfluidic channel intersecting the first microfluidic channel at a first intersection; downstream of the first intersection, a second intersection of the first microfluidic channel and third and fourth microfluidic channels; and downstream of the second intersection, a third intersection of the third and fourth microfluidic channels and a fifth microfluidic channel. In some cases, the second intersection, the third intersection, the third microfluidic channel and the fourth microfluidic channel together define an ellipse, a circle, a polygon, a convex shape, or another shape.

The article, in yet another set of embodiments, comprises a microfluidic channel containing a groove defined in a wall of the channel. In some cases, the groove comprises at least one wall that is not substantially parallel to a wall of the microfluidic channel.

In one set of embodiments, the article comprises a microfluidic channel containing a groove defined in a wall of the channel, where the groove has a cross-sectional area that decreases along the microfluidic channel in a direction of average fluid flow within the microfluidic channel. The article, in another set of embodiments, comprises a microfluidic channel containing a groove defined in a wall of the channel, where the groove has a first cross-sectional area in a first portion of the microfluidic channel and a second cross-sectional area in a second portion of the microfluidic channel. In some cases, the first cross-sectional area is at least about 10% or at least about 20% greater than the second cross-sectional area, relative to the second-cross sectional area.

The article, in yet another set of embodiments, includes a microfluidic channel containing a tapered groove defined in a wall of the channel. In still another set of embodiments, the article comprises a microfluidic channel containing a groove defined in a wall of the channel, where in a first location, the groove and the microfluidic channel each have a first width, the first width of the groove being not less than the first width of the microfluidic channel, and in a second location, the groove and the microfluidic channel each have a second width, the second width of the groove being less than the second width of the microfluidic channel.

According to another set of embodiments, the article comprises a microfluidic channel containing a groove defined in a wall of the channel, where the groove contains a first sidewall and an opposed sidewall facing the first sidewall. In some cases, the first sidewall and the opposed sidewall are not substantially parallel to each other. In another set of embodiments, the article comprises a microfluidic channel containing a groove defined in a wall of the channel, wherein the groove contains a first sidewall and an opposed sidewall facing the first sidewall. In certain cases, the first sidewall is not substantially parallel and the opposed sidewall is substantially parallel to a wall of the microfluidic channel. The article, in still another set of embodiments, comprises a microfluidic channel containing a groove defined in a wall of the channel, wherein the groove comprises at least one wall that has a slope of between about 0.001 and about 0.2 relative to a direction of average fluid flow in the microfluidic channel.

In another aspect, the present invention is directed to a method. In one set of embodiments, the method comprises acts of flowing a first fluidic droplet and a second fluidic droplet in a liquid within a microfluidic channel, the first fluidic droplet and the second fluidic droplet each stabilized in the liquid using a surfactant; exposing the first fluidic droplet and/or the second fluidic droplet to a solvent able to alter interfacial tension of the surfactant; and causing the first fluidic droplet and the second fluidic droplet to merge into a combined droplet.

The method, in another set of embodiments, comprises acts of flowing a first fluidic droplet and a second fluidic droplet in a liquid within a microfluidic channel, the first fluidic droplet and the second fluidic droplet each stabilized in the liquid using a surfactant, the first fluidic droplet and the second fluidic droplet in physical contact with each other; and exposing the droplets to a solvent able to alter interfacial tension of the surfactant.

In another set of embodiments, the method comprises flowing a first fluidic droplet and a second fluidic droplet in a liquid within a microfluidic channel, the first fluidic droplet and the second fluidic droplet each stabilized in the liquid using a surfactant, altering at least some of the surfactant of the first fluidic droplet and/or the second fluidic droplet, and causing the first fluidic droplet and the second fluidic droplet to merge.

The method in still another set of embodiments, includes acts of flowing a first fluidic droplet and a second fluidic droplet in a liquid within a microfluidic channel, the first fluidic droplet and the second fluidic droplet each stabilized in the liquid using a surfactant, the first fluidic droplet and the second fluidic droplet in physical contact with each other and with a wall of the microfluidic channel, and inserting a fluid between the contacted droplets, and the wall, the fluid comprises a solvent able to alter interfacial tension of the surfactant.

In another set of embodiments, the method comprises acts of flowing a fluidic droplet in a liquid in a microfluidic channel, the microfluidic channel containing a groove defined in a wall of the channel; and causing the fluidic droplet to move towards a wall of the microfluidic channel via interaction of the fluidic droplet with the groove.

In one set of embodiments, the method includes acts of flowing a fluidic droplet within a microfluidic channel such that a portion of the fluidic droplet enters a groove defined in a wall of the channel. In certain embodiments, the position of the fluidic droplet within the microfluidic channel is controlled, at least in part, by the groove within the wall of the channel. The method, in another set of embodiments, includes an act of flowing a fluidic droplet within a microfluidic channel such that a portion of the droplet enters a groove defined in a wall of the channel. In some cases, upon entrance of the portion of the droplet into the groove, the droplet changes velocity within the channel. In still another set of embodiments, the method includes an act of flowing a first fluidic droplet and a second fluidic droplet in a microfluidic channel containing a groove defined in a wall of the channel, such that at least the first fluidic droplet and the second fluidic droplet are brought into contact with each other upon interaction of at least one of the first fluidic droplet and the second fluidic droplet with the groove.

In another aspect, the present invention encompasses methods of making one or more of the embodiments described herein, for example, a device for coalescing droplets. In still another aspect, the present invention encompasses methods of using one or more of the embodiments described herein, for example, a device for coalescing droplets.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention generally relates to microfluidics, and, in particular, to systems and methods for coalescing or fusing droplets. In certain aspects, two or more droplets within a microfluidic channel are brought together and caused to coalesce without using electric fields or charges. For example, in certain embodiments, droplets stabilized with a surfactant may be disrupted, e.g., by exposing the droplets to a solvent able to alter the surfactant, which may partially destabilize the droplets and allow them to coalesce. In some instances, the droplets may also be physically disrupted to facilitate coalesce. In addition, in some cases, the positions of one or more droplets may be controlled within a channel using a groove in a wall of the channel. For example, a droplet may at least partially enter the groove such that the position of the droplet is at least partially controlled by the groove. In this way, droplets can be brought together within a channel, e.g., to cause coalescence of the droplets. Other aspects of the present invention are generally directed to devices containing such microfluidic channels or for performing such methods, methods of preparing such devices, kits including such devices, or the like.

Figure 4A:
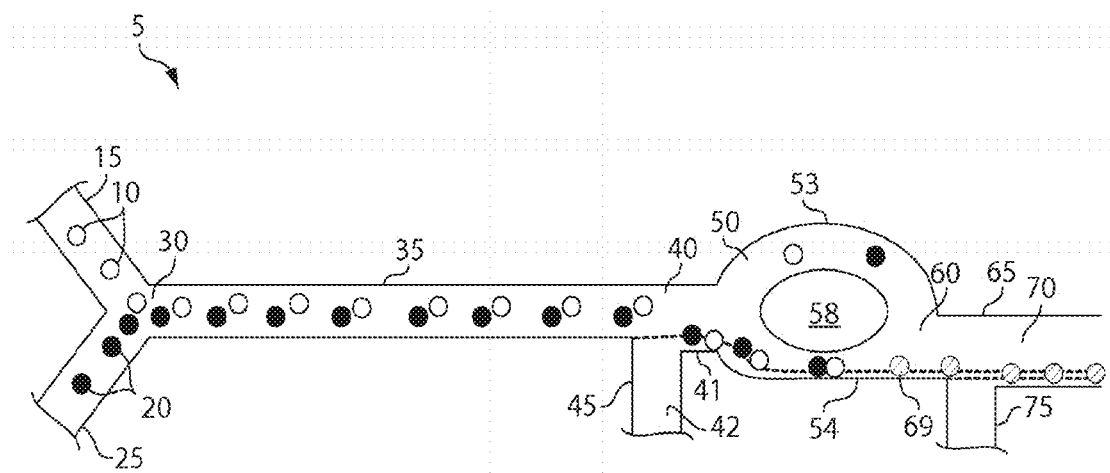
FIGS. 4A-4B illustrate various microfluidic devices, in certain embodiments of the invention.

One example of an embodiment of the invention is now described with respect to FIG. 4A. As will be discussed in more detail below, in other embodiments, other configurations may be used as well. In FIG. 4A, device 5 comprises a variety of channels, some or all of which may be microfluidic channels. A plurality of first droplets 10 flows in through inlet channel 15 while a plurality of second droplets 20 flows through inlet channel 25.

The droplets may be contained within a continuous-phase liquid, and in some cases, the fluid forming the first droplets and/or the second droplets is substantially immiscible with respect to the liquid. In some cases, the droplets may be stabilized as individual droplets within the liquid using a surfactant, e.g., a PFPE-PEG-PFPE triblock copolymer surfactant. In addition, the fluid within the first droplets and second droplets may the same or different, and the liquid entering through inlet channel 15 and the liquid entering through inlet channel 25 may also be the same or different.

The plurality of first droplets and the plurality of second droplets may each independently be created using any suitable technique, and the droplets may be created using the same or different techniques, e.g., using flow-focusing, T-junctions, or the like. In addition, the plurality of first droplets and the plurality of second droplets may be created within device 5, and/or be created off the device then introduced into the device. In some instances, the plurality of first droplets and/or the plurality of second droplets are relatively monodisperse, e.g., as described herein. In addition, the first droplets and the second droplets need not be of substantially equal size, although they can be in some cases.

At intersection 30, inlet channel 15 and inlet channel 25 meet to form first channel 35. In some cases, the plurality of first droplets and the plurality of second droplets may be introduced into device 5 such that, at intersection 30, the first droplets and the second droplets generally form an alternating pattern, as shown in FIG. 4A. (Of course, it should be understood that in reality, the first and second droplets may not necessarily always be perfectly alternate.) Within channel 35, in some cases, the first and second droplets may be brought together, e.g., such that the droplets come into direct physical contact with each other. For example, in some embodiments, a first droplet may move at a first velocity, and the second droplet may be caused to move at a second velocity different from the first velocity, for instance, substantially greater than the first velocity, thereby allowing the second droplet to "catch up" with the first droplet within channel 35.

In addition, in some embodiments, the first and/or second fluidic droplets may be caused to move towards a wall of the channel. For example, in certain embodiments, the first and/or second droplets may interact with various features that cause the droplets to move towards a wall of the channel. For example, the feature may include a groove, a ramp, a protrusion and/or other feature(s) defined in a wall of the channel, e.g., in a sidewall, a "floor," or a "ceiling" within the channel (e.g., as defined during normal operation of the device). Interaction of the droplets with the feature may result in the first and/or second droplets moving towards a wall within the channel. For instance, FIG. 5E illustrates a tapered groove present in a "ceiling" wall of the microfluidic channel, which causes the droplets to move towards the bottom of the figure as the droplets flow along the channel. Examples of such interactions are discussed in more detail below.

Referring again to FIG. 4A, at intersection 40, second channel 45 intersects first channel 35. In some cases, second channel 45 may contain a solvent 42 able to alter the interfacial tension of the surfactant, or second channel 45 may contain other materials 42 that are able to disrupting a surface property of the first fluidic droplet and/or the second fluidic droplet, for example, by causing physical removal or chemical reaction of the surfactant. As a non-limiting example, in one set of embodiments, second channel 45 contains an alcohol (for example, a fluorinated alcohol such as 2,2,3,3,4,4,4-heptafluoro-1-butanol). Other examples of suitable solvents and other materials are discussed in more detail below.

At intersection 40, the first fluidic droplet and/or the second fluidic droplet may be exposed to solvent (or other material) 42 entering through channel 45. Solvent 42 can then interact with surfactant on the first and/or second fluidic droplets, thereby causing some destabilization of the droplets. The destabilization may be controlled, for example, by controlling the amount and/or concentration of solvent entering channel 35 from channel 45, or other techniques such as those described herein.

As mentioned, in some cases, the first fluidic droplet and the second fluidic droplet may be in direct physical contact with each other and/or with a wall of channel 35. In some cases, solvent (or other material) 42 entering channel 35 may be forced or urged to flow along the side of channel 35, e.g., due to the flow of the liquid containing the first fluidic droplet and the second fluidic droplet. Accordingly, by causing the first fluidic droplet and/or the second fluidic droplet to move towards the wall of the channel where solvent (or other material) 42 is introduced, the droplets may thereby be brought into contact with the solvent. For example, as is shown in FIG. 4A, first fluidic droplet 11 and second fluidic droplet 21 are in contact with each other and with wall 41, and solvent (or other material) 42 enters from channel 45 into channel 35 and is inserted between the first and second fluidic droplets, and the wall. However, it should also be understood that in other embodiments, this process may occur without necessarily requiring the first fluidic droplet and the second fluidic droplet to be in direct physical contact with each other and/or with a wall of channel 35.

In some embodiments, disruption of the first fluidic droplet and the second fluidic droplet, e.g., via exposure of the droplets to the solvent or other material, may be sufficient to cause coalescence of the first and second droplets to occur spontaneously, e.g., such that the first fluidic droplet and the second fluidic droplet to merge or coalesce into a combined droplet and the droplets can no longer be identified or distinguished as two separate droplets. Mixing may thereby occur in some cases between fluid or species contained within the first droplet and fluids or species contained within the second droplet. However, in other cases, some disruption of the first fluidic droplet and the second fluidic droplet, e.g., physical or electrical disruption, is necessary to cause coalescence of the droplets to occur.

As one non-limiting example of a method to cause physical disruption or disturbance of the fluidic droplets, now referring again to FIG. 4A, in some embodiments, downstream of intersection 40, channel 35 may split at intersection 50 into a third channel 53 and a fourth channel 54. The first and second droplets may flow into channel 54, although in some cases, at least some of the droplets may flow into channel 53. The split in channel 35 causes an alteration the flow of the droplets within the channel, which may induce the droplets (which are in physical contact) to coalesce with each other, e.g., forming combined droplet 69. In addition, as discussed in more detail below, this process may not necessarily be exactly the same for each pair of droplets; for example, some may coalesce immediately, while others may require additional changes or disruptions to induce coalescence.

As a non-limiting example, as is shown in FIG. 4A, the average cross-sectional dimension of channel 54 may not be substantially constant, but may vary, which may cause the flow of the first droplet and the second droplet to change. For example, widening of the channel may cause the droplets to slow down, while narrowing of the channel may cause the droplets to speed up. For instance, in some cases, the channel may be constructed and arranged such that the droplets are physically forced or contacted together, e.g., due to changing velocities, which may facilitate their coalescence.

However, it should be understood that the above is only one non-limiting example of a method of disrupting the first fluidic droplet and the second fluidic droplet, e.g., to cause the droplets to merge or coalesce. Other examples include causing the first fluidic droplet and/or the second fluidic droplet to encounter one or more obstructions within the channel, applying an electrical effect to the first fluidic droplet and/or the second fluidic droplet, or the like, e.g., as discussed in more detail below.

In FIG. 4A, channel 53 and channel 54 rejoin at intersection 60, forming channel 65 exiting the intersection. Accordingly, channels 53 and 54 together define shape 58 in FIG. 4A, in this example, an ellipse or an oval, although other shapes are also possible in other embodiments, including convex shapes and/or angled shapes. In some cases, shape 58 may be relatively large; for example, such that the maximum distance between channels 53 and 54 within shape 58 is at least about 10 micrometers or at least about 50 micrometers. In addition, in still other embodiments, channels 53 and 54 may not necessarily recombine; for example, channel 53 may flow to a different portion of the device or to waste, etc. In addition, in some cases, some of the channels may be substantially aligned. For example, in some embodiments, a straight line can be drawn, without exiting, through channels 35, 54, and 65.

At intersection 70, channel 75 intersects channel 65. Channel 75 may introduce a fluid able to restabilize the combined fluidic droplets 69 flowing within channel 65, e.g., such that multiple combined droplets could potentially physically come into contact with each other without coalescing. For example, additional surfactant and/or liquid may flow into channel 65 from channel 75, and the additional surfactant may be the same or different from the initial surfactant added to the first droplets and/or the second droplets prior to their coalescence. In some cases, upon contacting of the surfactant with the combined fluidic droplet, at least some of the surfactant becomes incorporated into the interface between the droplet and the surrounding liquid, thereby enhancing stabilization of the combined droplets.

Thus, the above discussion is a non-limiting example of one embodiment of the present invention that can be used to produce coalesced droplets. However, other embodiments are also possible. Accordingly, as is discussed below, various aspects of the invention are directed to various systems and methods for causing droplet coalescence.

One aspect of the present invention is generally directed to systems or apparatuses for causing droplets to coalesce. The droplets may, in some embodiments, be contained within channels such as microfluidic channels, e.g., within a suitable fluidic device. In addition, the droplets may be relatively monodisperse in some instances. In one set of embodiments, a first fluidic droplet and a second fluidic droplet are caused to merge or coalesce by disrupting a surfactant of the first fluidic droplet and/or the second fluidic droplet. As is discussed herein, the disruption may be, for example, a chemical or physical disruption to the surfactant, and/or to the droplets.

As mentioned, in some cases, a plurality of first droplets and a plurality of second droplets may be merged or coalesced in some fashion. The droplets to be merged or coalesced may be produce using any suitable technique. For example, a junction of channels may be used to create the droplets. The junction may be, for instance, a T-junction, a Y-junction, a channel-within-a-channel junction (e.g., in a coaxial arrangement, or comprising an inner channel and an outer channel surrounding at least a portion of the inner channel), a cross (or "X") junction, a flow-focus junction, or any other suitable junction for creating droplets. See, for example, International Patent Application No. PCT/US2004/010903, filed Apr. 9, 2004, entitled "Formation and Control of Fluidic Species," by Link, et al., published as WO 2004/091763 on Oct. 28, 2004, or International Patent Application No. PCT/US2003/020542, filed Jun. 30, 2003, entitled "Method and Apparatus for Fluid Dispersion," by Stone, et al., published as WO 2004/002627 on Jan. 8, 2004, each of which is incorporated herein by reference in its entirety. In some embodiments, the junction may be configured and arranged to produce substantially monodisperse droplets.

The droplets may also be created on the fluidic device, and/or the droplets may be created separately then brought to the device. As an example, in one set of embodiments, a plurality of first droplets is created separately, and a plurality of second droplets is created in the device, e.g., such that production of the second droplets is substantially synchronized to the flow of first droplets into the device, for example, so that the first and second droplets can be brought into contact with each other at a ratio of about 1:1 for coalesce. Other techniques for synchronizing droplet production can also be used in other embodiments, for example, those discussed in Int. Pat Apl. No. PCT/US04/10903, filed Apr. 9, 2004, entitled "Formation and Control of Fluidic Species," by Link, et al., published as WO 2004/091763 on Oct. 28, 2004 or Int. Pat Apl. No. PCT/US04/27912, filed Aug. 27, 2004, entitled "Electronic Control of Fluidic Species," by Link, et al., published as WO 2005/021151 on Mar. 10, 2005, each incorporated herein by reference in its entirety.

In one set of embodiments, the plurality of first droplets and the plurality of second droplets may be brought into a channel, such as a microfluidic channel, using any suitable technique. For example, the first droplets and the second droplets may be introduced into the channel using the same or different inlet channels, or droplets may be directly formed within the channel, e.g., using a T-junction, a Y-junction, a channel-within-a-channel junction, a cross junction, a flow-focus junction, or using any other suitable technique. If inlet channels are used, the inlet channels may be in a T-junction, a Y-junction (see, e.g., FIG. 5A), or in any other suitable configuration.

In some cases, the droplets are produced and/or coalesced at relatively high rates. For instance, in some cases, greater than about 1 droplet/s, greater than about 3 droplets/s, greater than about 5 droplets/s, greater than about 10 droplets/s, greater than about 30 droplets/s, greater than about 50 droplets/s, greater than about 100 droplets/s, greater than about 300 droplets/s, greater than about 500 droplets/s, greater than about 1,000 droplets/s, greater than about 3,000 droplets/s, greater than about 5,000 droplets/s, greater than about 10,000 droplets/s, greater than about 30,000 droplets/s, greater than about 50,000 droplets/s, or greater than about 100,000 droplets/s, etc. may be produced and/or coalesced.

The first droplets and second droplets may be brought together to be coalesced, typically such that one first droplet and one second droplet are coalesced to form a combined droplet, i.e., in a 1:1 ratio. For example, the droplets may be brought together within a channel such that a first droplet is proximate or physically contacts a second droplet. However, in certain embodiments, the ratio of first droplets to second droplets may not be exactly 1:1. For example, the ratio may be between about 0.95:1 and about 1.05:1, between about 0.9:1 and about 1.1:1, between about 0.85:1 and about 1.15:1, between about 0.8:1 and about 1.2:1, between about 0.75:1 and about 1:25:1, or between about 0.5:1 and about 2:1, e.g., due to imperfections in this process. In addition, in some embodiments, a different ratio may be desired. For example, the droplets may be brought together at a ratio of 1:2 or 1:3 of first droplets to second droplets, or second droplets to first droplets.

In addition, in some cases, the plurality of first droplets and/or the plurality of second droplets may each independently be substantially monodisperse, in some embodiments, and/or independently have any of the following features. For example, in some cases, a plurality of droplets may have a distribution of characteristic dimensions such that no more than about 20%, no more than about 18%, no more than about 16%, no more than about 15%, no more than about 14%, no more than about 13%, no more than about 12%, no more than about 11%, no more than about 10%, no more than about 5%, no more than about 4%, no more than about 3%, no more than about 2%, no more than about 1%, or less, of the droplets have a characteristic dimension greater than or less than about 20%, less than about 30%, less than about 50%, less than about 75%, less than about 80%, less than about 90%, less than about 95%, less than about 99%, or more, of the average characteristic dimension of all of the droplets of the plurality of droplets. Those of ordinary skill in the art will be able to determine the average characteristic dimension of a population of droplets, for example, using laser light scattering, microscopic examination, or other known techniques. In one set of embodiments, a plurality of droplets may have a distribution of characteristic dimension such that no more than about 20%, no more than about 10%, or no more than about 5% of the droplets may have a characteristic dimension greater than about 120% or less than about 80%, greater than about 115% or less than about 85%, or greater than about 110% or less than about 90% of the average of the characteristic dimension of the plurality of droplets. The "characteristic dimension" of a droplet, as used herein, is the diameter of a perfect sphere having the same volume as the droplet. In addition, in some instances, the coefficient of variation of the characteristic dimension of a plurality of droplets may be less than or equal to about 20%, less than or equal to about 15%, or less than or equal to about 10%.

The average characteristic dimension of a plurality of droplets, in some embodiments, may be less than about 1 mm, less than about 500 micrometers, less than about 200 micrometers, less than about 100 micrometers, less than about 75 micrometers, less than about 50 micrometers, less than about 25 micrometers, less than about 10 micrometers, or less than about 5 micrometers in some cases. The average characteristic dimension may also be greater than or equal to about 1 micrometer, greater than or equal to about 2 micrometers, greater than or equal to about 3 micrometers, greater than or equal to about 5 micrometers, greater than or equal to about 10 micrometers, greater than or equal to about 15 micrometers, or greater than or equal to about 20 micrometers in certain cases.

In certain embodiments, the characteristic dimension of the plurality of first droplets and the characteristic dimension of the plurality of second droplets may be substantially the same. In some cases, the characteristic dimensions may be within about 20 micrometers, within about 15 micrometers, within about 12 micrometers, within about 10 micrometers, within about 8 micrometers, within about 6 micrometers, within about 5 micrometers, within about 4 micrometers, within about 3 micrometers, within about 2 micrometers, or within about 1 micrometer of each other. In another set of embodiments, the characteristic dimensions of the pluralities of droplets may be between about 120% and about 80%, between about 115% and about 85%, between about 110% and about 90%, or between about 105% and about 95% of the average of the characteristic dimension of the plurality of first droplets and the plurality of second droplets. In still another set of embodiments, the average volume of the first droplets may be no more than about 10 times bigger than the average volume of the second droplets, and in some cases, the volume of the first fluidic droplets may be no more than about 8 times, no more than about 7 times, no more than about 6 times, no more than about 5 times, no more than about 4 times, no more than about 3 times, or no more than about 2 times the volume of the second fluidic droplets.

In some embodiments, a species may be contained within the droplet, e.g., before or after formation. Thus, for example, a species may be contained within the first fluid and/or the second fluid. In some cases, more than one species may be present. Thus, for example, a precise quantity of a drug, pharmaceutical, or other agent can be contained within a droplet. As another example, one or more cells may be contained within a droplet. Other species that can be contained within a droplet include, for example, biochemical species such as nucleic acids such as siRNA, mRNA, RNAi and DNA, proteins, peptides, or enzymes, or the like. Additional species that can be contained within a droplet include, but are not limited to, nanoparticles, quantum dots, fragrances, proteins, indicators, dyes, fluorescent species, chemicals, amphiphilic compounds, detergents, drugs, foods or food components, or the like. Further examples of species that can be contained within a droplet include, but are not limited to, pesticides, such as herbicides, fungicides, insecticides, growth regulators, vitamins, hormones, and microbicides. A droplet can also serve as a reaction vessel in certain cases, such as for controlling chemical reactions, or for in vitro transcription and translation, e.g., for directed evolution technology.

In one set of embodiments, the fluid within the droplets is aqueous or relatively hydrophilic, while the liquid containing the droplets is an oil or is relatively hydrophobic. However, in other embodiments, other configurations are possible, e.g., the fluid within the droplets may be relatively hydrophobic while the liquid containing the droplets is relatively hydrophilic. Non-limiting examples of oils that could be used in various embodiments include perfluoroethers (e.g., Novec HFE-7500, CAS No. 297730-93-9; Novec HFE-7200, CAS No. 163702-06-5; or Novec HFE-7100, CAS No. 163702-07-6), or other oils such as Fluorinert FC-70, CAS No. 86508-42-1; Fluorinert FC-40, CAS No. 86508-42-1; or Fluorinert FC-3283, CAS No. 86508-42-1, etc. Non-limiting examples of aqueous fluids include water, buffers such as phosphate-buffered saline, or cell culture media. Other suitable examples of fluids include any of those discussed herein.

In certain aspects, the first droplets and/or the second droplets are stabilized using a surfactant. Typically, the surfactant is present at the interface between the fluid contained within a droplet and the liquid surrounding the droplet. In many cases, the surfactant has a relatively hydrophilic ("head") region and a relatively hydrophobic ("tail") region. In some cases, the surfactant may have more than one relatively hydrophilic region and/or more than one relatively hydrophobic region. The surfactant may be positioned at the interface and oriented such that the hydrophilic region is directed to the relatively hydrophilic fluid and the hydrophobic region is directed to the relatively hydrophobic fluid, thereby stabilizing the droplet within the liquid. After stabilization, for example, droplets directly physically contacting each other within a liquid may be unable to coalesce together to form a single, combined droplet, when in the absence of the surfactant, the droplets would otherwise coalesce together into a combined droplet, e.g., such that the fluids within the droplet are able to mix and/or such that the droplets can no longer be identified or distinguished as two separate droplets with a discrete interface between the droplets.

The first and second droplets may have the same surfactant, or different surfactants in some cases. Any of a wide variety of surfactants may be used, and such surfactants are commonly known to those of ordinary skill in the art. One non-limiting example of a surfactant is a copolymeric solvent, e.g., having any suitable number of copolymeric blocks. For example, the copolymer may be a diblock copolymer, a triblock copolymer, etc. For example, the copolymeric solvent may comprise one or more blocks of a PFPE, or other hydrophobic block, and/or one or more blocks of a PEG or other hydrophilic block. As a non-limiting example, the surfactant may comprise PFPE-PEG-PFPE triblock copolymer, where PFPE is an oligomeric perfluorinated polyether and PEG is polyethylene glycol. Other examples of surfactants may be found in, e.g., C. Holtze, et al., "Biocompatible Surfactants for Water-in-Fluorocarbon Emulsions," *Lab Chip*, 8(10):1632-9, 2008; J. Clausell-Tormos, et al., "Droplet-Based Microfluidic Platforms for the Encapsulation and Screening of Mammalian Cells and Multicellular Organisms," *Chem. & Biol.*, 15(5): 427-437, 2008; or Int. Pat Apl. No. PCT/US07/17617, filed Aug. 7, 2007, entitled "Fluorocarbon Emulsion Stabilizing Surfactants," by Holtze, et al., published as WO 2008/021123 on Feb. 21, 2008, each incorporated herein by reference.

Figure 6A:
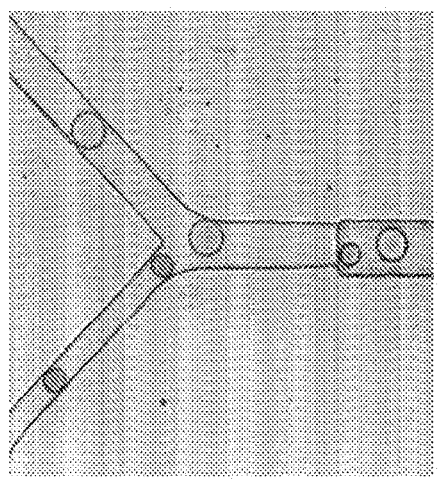
FIGS. 6A-6B illustrate droplet coalescence, in one embodiment of the invention.
Figure 6B:
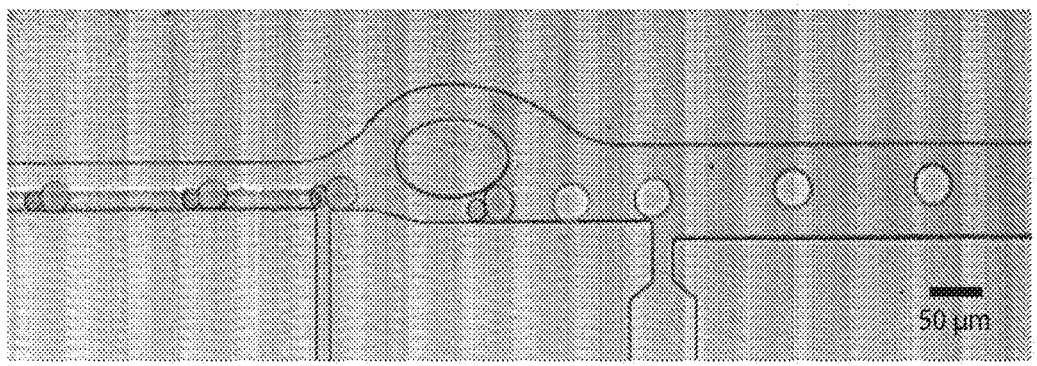

In certain aspects, a first droplet may move at a first velocity within the channel, and the second droplet may move at a second velocity different from the first velocity, for instance, substantially greater than the first velocity, thereby allowing the second droplet to come into contact (or "catch up") with the first droplet within channel. For instance, as can be seen in FIG. 6, a smaller droplet and a larger droplet initially start isolated from each other within the channel in FIG. 6A, but eventually the droplets are brought into direct physical contact (or nearly so) in FIG. 6B. This may be accomplished, in one set of embodiments, using droplets having different sizes or volumes, and inducing parabolic flow or laminar within the channel.

Without wishing to be bound by any theory, it is believed that the smaller droplet may be subject to a higher fluid average velocities pressing against it under parabolic flow, while the larger droplet in the channel is subject to a lower fluid average velocity. Thus, by selecting the size of the fluidic droplets that are produced, smaller fluidic droplets can then move at greater velocities than larger fluidic droplets. Accordingly, in a channel, a smaller fluidic droplet may "catch up" with a larger fluidic droplet, for instance, such that the two fluidic droplets come into physical contact, e.g., prior to causing their fusion or coalescence to occur. For instance, the smaller fluidic droplet may move at a velocity that is at least about 125%, at least about 150%, at least about 200%, at least about 300%, at least about 400%, or at least about 500% that of the velocity of the larger fluidic droplet.

In addition, other techniques for causing droplets to come into contact with each other within a channel include using droplets having different physical characteristics (e.g., different surface tensions, viscosities, densities, masses, or the like), or other techniques, including those disclosed in Int. Pat. Apl. No. PCT/US2007/002063, filed Jan. 24, 2007, published as WO 2007/089541 on Aug. 9, 2007, incorporated by reference herein in its entirety.

In addition, in some aspects, the first droplet and/or the second droplet may be caused to come into contact with a wall (e.g., a side wall) of the microfluidic channel (i.e., instead of and/or in addition to coming into contact with each other). For example, in FIG. 6, droplets entering the channel eventually come into contact with the wall of the channel towards the bottom of the page (see, e.g., the droplets entering from the left side of the channel in FIG. 6B). Any of a variety of techniques may be used to cause the droplets to move to a wall, including buoyancy or gravitational effects, creating electrical charges on the droplets and applying an electric field to the droplets to cause them to move within the channel, or the like.

In one set of embodiments, a physical feature, such as a groove or obstruction is used to at least partially control or guide droplets within the channel. For example, one or more obstructions may protrude from a wall of the channel, for example, a sidewall, a "floor," or a "ceiling" of the channel. Similarly, a groove may be defined in all, or a portion of, a wall of the channel, such as the sidewall, floor, or ceiling.

In certain embodiments, droplets containing a fluid flow within a liquid contained within a channel, where the fluidic droplets has a density less than the liquid. For instance, the density of the fluid within the fluidic droplet may be less than about 0.98, less than about 0.95, less than about 0.93, less than about 0.9, less than about 0.85, less than about 0.8, less than about 0.7, less than about 0.6, or less than about 0.5 times the density of the liquid in the microfluidic channel. Under such conditions, the fluidic droplets would have a tendency to rise relative to the liquid, thereby coming into contact with the ceiling of the channel. Similarly, if the fluidic droplets have a density greater than that of the liquid, the fluidic droplets would have a tendency to sink relative to the liquid, and thereby come into contact with the floor of the channel. For example, the density of the liquid within the fluidic droplet may be greater than about 1.02, greater than about 1.05, greater than about 1.08, greater than about 1.1, greater than about 1.15, greater than about 1.2, greater than about 1.3, greater than about 1.4, greater than about 1.5, greater than about 1.6, or greater than about 1.7 times the density of the liquid in the microfluidic channel. Under such conditions, features such as grooves or protrusions can be used to control the flow of such droplets within the channel.

For example, if a groove is present within a wall of the channel, a droplet contacting that wall may interact with the groove in some way, for example, by at least partially entering the groove. Upon entrance of at least a portion of the droplet into the groove, the position of the groove within the channel may partially or fully control the position of the droplet within the channel, e.g., due to the difficulty of the droplet subsequently exiting the channel. Accordingly, changes in position of the groove within the channel may lead to corresponding changes in position of the droplet within the channel.

Figure 13A:
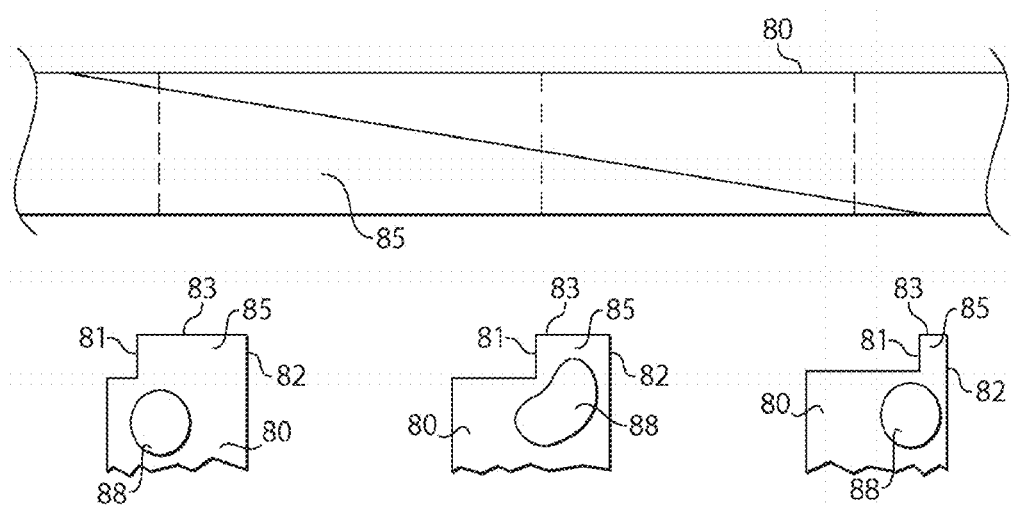
FIGS. 13A-13D illustrate various techniques for moving droplets towards a wall, in accordance with certain embodiments of the invention.

An example of such a groove is now described with reference to FIG. 13A. In this figure, a channel 80 having a groove 85 is shown in overhead view, with various cross sections as indicated. Groove 85 includes sidewalls 81 and 82, generally opposed and facing each other, as well as ceiling 83. While groove 85 is shown as being generally rectangular in cross-section in this image, in other embodiments, groove 85 may have other cross-sectional shapes, e.g., semi-circular, triangular, irregular, etc. As channel 80 moves from left to the right, groove 85 progressively tapers towards the bottom of the page. A droplet 88 at least partially enters groove 85 in the left cross-section, then as the groove tapers, the droplet is urged towards the right in cross-sectional view, towards a wall of the channel (wall 89, towards the bottom of the page in the overhead view).

In one set of embodiments, groove 85 contains one or more features that allow the groove to interact with a fluidic droplet within channel 80 (e.g., partially inserted into groove 85), and in some cases, to cause the fluidic droplet to move towards a wall. For example, groove 85 may generally decrease in cross-sectional area along the length of channel 80, e.g., in a direction of average fluid flow within the channel, causing droplets interacting with the groove to move in order to stay at least partially within the groove. The decrease in cross-sectional area may be linear or non-linear. In one set of embodiments, the groove may have a first cross-sectional area in a first portion of the channel (e.g., in an upstream portion) and a second cross-sectional area in a second portion of the channel (e.g., in a downstream portion), wherein the first cross-sectional area is at least about 5% greater than the second cross-sectional area, relative to the second-cross sectional area. In some embodiments, the first cross-sectional area is at least about 10%, at least about 15%, at least about 20%, at least about 25%, at least about 30%, at least about 40%, at least about 50%, at least about 75%, or at least about 100% greater than the second cross-sectional area, relative to the second-cross sectional area. In some cases, the first cross-sectional area is no more than about 200%, no more than about 150%, no more than about 100%, no more than about 75%, no more than about 50%, or no more than about 25% greater than the second cross-sectional area, relative to the second-cross sectional area.

In some embodiments, the decrease in area may be relatively smooth, e.g., such that the cross-sectional area of the groove decreases along the channel, e.g., in a direction of average fluid flow within the channel. For example, the groove may be tapered, e.g., such that at least one or both sidewalls within the groove is not orthogonal or parallel to a sidewall of the channel. In some cases, the groove may be tapered such that a first sidewall is not substantially parallel and an opposed sidewall is substantially parallel to a wall of the microfluidic channel, or where the first sidewall and the opposed sidewall are not substantially parallel to each other. In some embodiments, at a first location the groove may have a width that is no less than the width of the microfluidic channel at that location, and at a second location (e.g., one that is downstream of the first location), the groove may have a width that is less than the width of the microfluidic channel. The groove may also be relatively small, relative to the microfluidic channel. For instance, in some cases, the groove may have a width, depth, or cross-sectional area of less than about 50%, less than about 40%, less than about 30%, less than about 20%, or less than about 10% of the width, depth, or cross-sectional area of the microfluidic channel, respectively, e.g., at at least one location within the microfluidic channel.

In one set of embodiments, the groove may be tapered or sloped, e.g., relative to the walls of the channel. For example, the groove may have one or more walls that are not substantially parallel or orthogonal to a wall of the channel. For instance, in some embodiments, a sidewall of the groove may be sloped, e.g., relative to a direction of average fluid flow in the microfluidic channel or relative to a sidewall of the microfluidic channel. In some cases, the slope may be constant, although in other embodiments, the slope need not be constant. In some cases, the slope may be greater than about 0.001, greater than about 0.002, greater than about 0.003, greater than about 0.005, greater than about 0.007, or greater than about 0.01. In some cases, the slope may be less than about 0.2, less than about 0.1, less than about 0.07, less than about 0.05, less than about 0.03, less than about 0.02, or less than about 0.01. Combinations of any of these are possible, e.g., the slope may be between about 0.001 and about 0.2.

The groove may be relatively long, in certain embodiments. For example, the groove may have a length of at least about 0.5 mm, at least about 1 mm, at least about 2 mm, or at least about 3 mm. In certain cases, however, the groove may have a length of no more than about 5 mm, no more than about 4 mm, no more than about 3 mm, no more than about 2 mm, or no more than about 1 mm.

In addition, it should be noted that although a relatively straight, tapered groove is described here, the groove may have other shapes (including curved shapes, S shapes, or the like) that may be used to control the position of a droplet within a channel, in accordance with certain other embodiments of the invention. For example, a portion of a fluidic droplet may enter a groove, and then the position of the fluidic droplet within the channel may be controlled, at least in part, by the groove within the wall of the channel. For example, the groove may increase or decrease in cross-sectional area and/or height, or move relative to the channel, to cause changes in the position of the droplet as it flows within the channel.

In addition, in some embodiments, the velocity or other flow characteristics of the droplet may change, e.g., upon entry of at least a portion of the droplet into the groove, or other interaction with the groove. For instance, upon entrance of the portion of the droplet into the groove, the droplet changes velocity within the channel, e.g., due to causing the droplet to adopt a different shape, and/or in causing the droplet to be positioned in a different location within the channel, e.g., in embodiments where the flow profile of fluid within the channel is not uniform in cross-section. Thus, as a non-limiting example, in some cases, a first droplet interacting with a channel may be slowed down, and a second, following droplet may be allowed to catch up or even contact the first droplet.

Figure 13B:
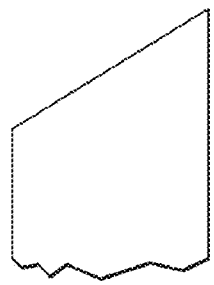
Figure 13C:
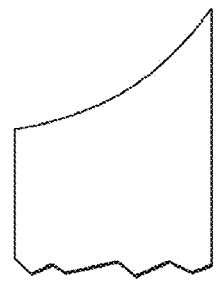
Figure 13D:
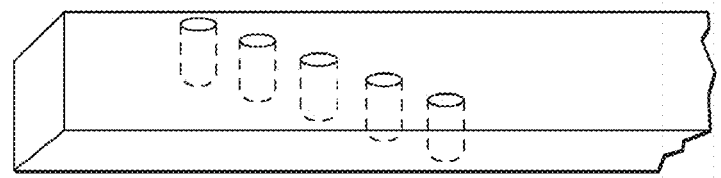

Other features may also be used to move or urge droplets towards a sidewall of a microfluidic channel, e.g., instead of or in addition to grooves. For example, in FIGS. 13B and 13C, the ceiling of the microfluidic channel itself is shaped to urge droplets to move towards a sidewall of the channel. For example, the ceiling of the microfluidic channel may be sloped (e.g., linearly sloped), and through the channel, the slope of the ceiling may change, e.g. becoming more pronounced, thereby urging the droplets to move towards a sidewall of the channel. In FIG. 13D, a plurality of protrusions or obstructions extending from one or more walls of the channel is used to urge droplets to move towards a sidewall of the channel. Non-limiting examples of obstructions are discussed in more detail herein.

In some aspects, the first droplet and/or the second droplet may be altered or disrupted, e.g., in order to cause the first fluidic droplet and the second fluidic droplet to merge or coalescence. For example, in one set of embodiments, the interfacial tension of the surfactant may be altered, e.g., by exposing the first fluidic droplet and/or the second fluidic droplet to a solvent able to alter interfacial tension of the surfactant, thereby disrupting the stability of the droplet. In other embodiments, the first fluidic droplet and/or the second fluidic droplet may be exposed to a fluid able to alter the surfactant or other surface properties of the droplets, e.g., by chemical reaction, dissolution, fluidic extraction, physical disruption, or the like. The amount of disruption may be controlled, for example, by controlling the concentration of solvent that is entering (e.g., within a suitable liquid, which may be the same or different than the liquid surrounding the droplets).

For instance, in one set of embodiments, the first droplet and/or the second droplet may be exposed to a solvent able to alter the interfacial tension of the surfactant. In some cases, sufficient solvent may be added to alter the interfacial tension by at least about 5 mN/m, by at least about 10 mN/m, by at least about 20 mN/m, by at least about 25 mN/m, by at least about 30 mN/m, by at least about 40 mN/m, etc. In some cases, the tension may be altered by no more than about 50 mN/m, by no more than about 40 mN/m, or no more than about 30 mN/m. Combinations of any of these are also possible in other embodiments.

In some embodiments, the solvent may cause precipitation or a chemical reaction when exposed to the surfactant. In some cases, this may alter interfacial tension of the surfactant. A simple screening test to determine whether the solvent and the surfactant precipitate or otherwise react is to mix various weight ratios of solvent and surfactant (e.g., under ambient conditions, varying between 0%:100% and 100%:0%), and determine whether precipitation or reaction occur. For example, the solvent and the surfactant may be substantially miscible at a first weight ratio, while they may precipitate or react at a second weight ratio.

In addition, in some cases, the solvent may be chosen to be substantially immiscible with the fluid within the droplets, and/or the solvent may be chosen to be substantially miscible with the liquid containing the droplets. Additionally, the solvent may also be chosen, in some instances, to be substantially inert or immiscible with the walls of the channel.

As a non-limiting example, the solvent may be an alcohol, such as a fluoroalcohol. For example, the alcohol may be a fluorinated propanol, a fluorinated butanol, a fluorinated pentanol, or a fluorinated hexanol. In one set of embodiments, the solvent is a perfluoroalcohol, such as 2,2,3,3,4, 4,4-heptafluoro-1-butanol; 2,2,3,3,3-pentafluoro-1-propanol; 2,2,3,4,4,4-hexafluoro-1-butanol; 1H,1H-nonafluoropentan-1-ol; or 1H,1H,2H,2H-perfluorohexan-1-ol; etc.

In another set of embodiments, the solvent may at least partially dissolve the surfactant, e.g., reducing the amount of surfactant present on the surface of the first and second droplets. In yet another set of embodiments, the solvent may at least partially extract surfactant from the droplets.

Any suitable technique may be used to expose the first droplet and the second droplet to the solvent. For example, as is shown in FIG. 4A, solvent may be introduced through a channel to the first droplet and the second droplet, e.g., inserted between the first and second fluidic droplets, and the wall, or such that the fluid is present in spaces between the droplets and the wall. However, it should be understood that other methods of causing exposure are also possible in other embodiments, and that the first droplet and the second droplet need not be contact a wall (or each other) in order to cause such exposure.

In some cases, the channel downstream of the intersection is larger than upstream of the intersection, e.g., to allow for additional fluid flow within the channel. For instance, in some cases, the channel downstream of the intersection has a width greater than the width of the channel upstream of the intersection.

In some aspects, the disruption to the first droplet and/or the second droplet caused by at least partially removing or dissolving the surfactant may be sufficient to cause the first droplet and/or the second droplet to merge or coalesce, e.g., if the first droplet and the second droplet are in direct physical contact with each other. However, in some embodiments, this may be initiated or facilitated by causing physical disruption of the first fluidic droplet and/or the second fluidic droplet in some fashion. For instance, the flow patterns of the first droplet and/or the second droplet (and/or of liquid containing the first droplet and the second droplet) may be altered in some fashion, causing the velocities (e.g., speed and/or direction) of the first droplet and/or the second droplet to change.

For example, the first droplet and/or the second droplet may flow around one or more obstructions, there may be changes in pressure, and/or there may be changes in the shape of the channel containing the droplets, which may cause changes in flow patterns or velocities of the droplets. In some cases, an electric field may be applied; however, in other embodiments, no electrical charges or electric fields are used to cause the first fluidic droplet and the second fluidic droplet to coalesce. In addition, it should be understood that in some cases, this process is not uniform, but may vary in timing from droplet to droplet.

In one set of embodiments, the droplets may encounter obstructions such as posts within the flow path of the droplets, which requires the droplets to move around the obstructions in some fashion. For example, the obstruction may be a post having a circular, triangular, diamond-shaped, square, rectangular, or irregular cross-section, and may completely span the channel or may only partially span the channel.

In another set of embodiments, the droplets may flow into a channel that changes in shape, size, width, cross-sectional area, etc., to cause a change in the flow of the droplets. For example, the channel may widen to cause the droplets to slow down (potentially causing the droplets to come more closely into direct contact with each other).

In certain aspects, the channel containing the droplets may branch, e.g., at a first intersection, and optionally recombine at a second intersection downstream of the first intersection. The channels may separate, for example, by at least about 10 micrometers, at least about 20 micrometers, at least about 30 micrometers, at least about 40 micrometers, at least about 50 micrometers, at least about 75 micrometers, at least about 100 micrometers, at least about 125 micrometers, at least about 150 micrometers, at least about 175 micrometers, at least about 200 micrometers, etc. In some cases, the maximum distance between the channels may be greater than the average of the average widths of the channels. In some embodiments, the channels may define a relatively smooth shape, such as a circle or an ellipse, although other shapes, such as polygons, or other convex shapes, are also possible. Such a configuration may be useful, for instance, to cause changes in the flow patterns of the droplets and the liquid containing the droplets, e.g., without changes in the volumetric flow rate.

In some aspects, after coalescence, the combined droplet may be re-stabilized by adding surfactant to the droplet. The surfactant may be the same or different than any surfactant(s) used to initially stabilize the first and second droplets. In one set of embodiments, the surfactant may be added from a channel intersecting the channel containing the combined droplet. The amount of surfactant that the droplet is exposed to may be controlled, in some embodiments, by controlling the entering concentration of surfactant.

Figure 14A:
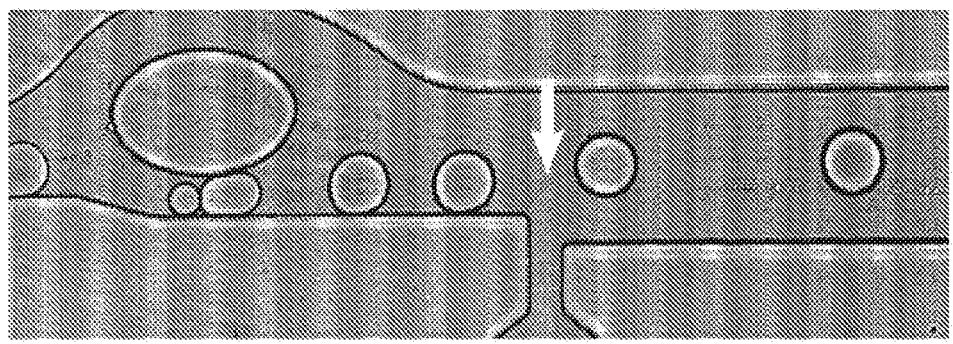
FIGS. 14A-14B illustrate solvent flow, in still other embodiments of the invention.
Figure 14B:
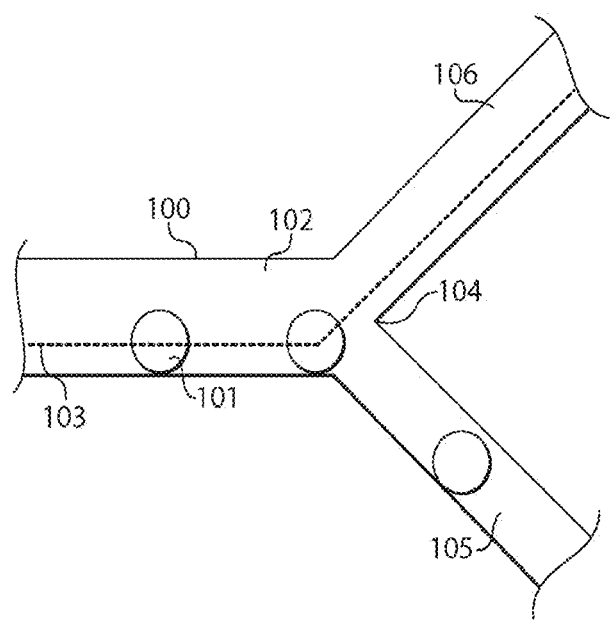

In some cases, the surfactant and/or liquid containing the surfactant may also be used to dilute solvent. For example, as is shown in FIG. 14A by the arrow, the solvent flow (previously along a wall of the channel) may be removed from the wall through action of incoming surfactant and/or liquid. (In some cases, this may occur even if no surfactant is present in the incoming liquid.) In addition, certain embodiments, the droplets may be steered away from the solvent. For instance, in FIG. 14B, droplets 101 and liquid 102 in channel 100 containing solvent 103 may reach a junction 104 where the droplets travel in a first branch 105 while the solvent flow continues in a second branch 106. In some cases, the channels may intersect substantially orthogonally, although other angles are also possible.

Certain aspects of the invention are generally directed to devices containing channels such as those described above. In some cases, some of the channels may be microfluidic channels, but in certain instances, not all of the channels are microfluidic. There can be any number of channels, including microfluidic channels, within the device, and the channels may be arranged in any suitable configuration. The channels may be all interconnected, or there can be more than one network of channels present. The channels may independently be straight, curved, bent, etc. In some cases, there may be a relatively large number and/or a relatively large length of channels present in the device. For example, in some embodiments, the channels within a device, when added together, can have a total length of at least about 100 micrometers, at least about 300 micrometers, at least about 500 micrometers, at least about 1 mm, at least about 3 mm, at least about 5 mm, at least about 10 mm, at least about 30 mm, at least 50 mm, at least about 100 mm, at least about 300 mm, at least about 500 mm, at least about 1 m, at least about 2 m, or at least about 3 m in some cases. As another example, a device can have at least 1 channel, at least 3 channels, at least 5 channels, at least 10 channels, at least 20 channels, at least 30 channels, at least 40 channels, at least 50 channels, at least 70 channels, at least 100 channels, etc.

In some embodiments, at least some of the channels within the device are microfluidic channels. "Microfluidic," as used herein, refers to a device, article, or system including at least one fluid channel having a cross-sectional dimension of less than about 1 mm. The "cross-sectional dimension" of the channel is measured perpendicular to the direction of net fluid flow within the channel. Thus, for example, some or all of the fluid channels in a device can have a maximum cross-sectional dimension less than about 2 mm, and in certain cases, less than about 1 mm. In one set of embodiments, all fluid channels in a device are microfluidic and/or have a largest cross sectional dimension of no more than about 2 mm or about 1 mm. In certain embodiments, the fluid channels may be formed in part by a single component (e.g. an etched substrate or molded unit). Of course, larger channels, tubes, chambers, reservoirs, etc. can be used to store fluids and/or deliver fluids to various elements or systems in other embodiments of the invention, for example, as previously discussed. In one set of embodiments, the maximum cross-sectional dimension of the channels in a device is less than 3 mm, less than 2 mm, less than 1 mm, less than 500 micrometers, less than 200 micrometers, less than 100 micrometers, less than 50 micrometers, or less than 25 micrometers.

A "channel," as used herein, means a feature on or in a device or substrate that at least partially directs flow of a fluid. The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlets and/or outlets or openings. A channel may also have an aspect ratio (length to average cross sectional dimension) of at least 2:1, more typically at least about 3:1, at least about 4:1, at least about 5:1, at least about 6:1, at least about 8:1, at least about 10:1, at least about 15:1, at least about 20:1, at least about 30:1, at least about 40:1, at least about 50:1, at least about 60:1, at least about 70:1, at least about 80:1, at least about 90:1, at least about 100:1 or more. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid. Non-limiting examples of force actuators that can produce suitable forces include piezo actuators, pressure valves, electrodes to apply AC electric fields, and the like. The fluid within the channel may partially or completely fill the channel. In some cases where an open channel is used, the fluid may be held within the channel, for example, using surface tension (i.e., a concave or convex meniscus).

The channel may be of any size, for example, having a largest dimension perpendicular to net fluid flow of less than about 5 mm or 2 mm, or less than about 1 mm, less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm. In some cases, the dimensions of the channel are chosen such that fluid is able to freely flow through the device or substrate. The dimensions of the channel may also be chosen, for example, to allow a certain volumetric or linear flow rate of fluid in the channel. Of course, the number of channels and the shape of the channels can be varied by any method known to those of ordinary skill in the art. In some cases, more than one channel may be used. For example, two or more channels may be used, where they are positioned adjacent or proximate to each other, positioned to intersect with each other, etc.

In certain embodiments, one or more of the channels within the device may have an average cross-sectional dimension of less than about 10 cm. In certain instances, the average cross-sectional dimension of the channel is less than about 5 cm, less than about 3 cm, less than about 1 cm, less than about 5 mm, less than about 3 mm, less than about 1 mm, less than 500 micrometers, less than 200 micrometers, less than 100 micrometers, less than 50 micrometers, or less than 25 micrometers. The "average cross-sectional dimension" is measured in a plane perpendicular to net fluid flow within the channel. If the channel is non-circular, the average cross-sectional dimension may be taken as the diameter of a circle having the same area as the cross-sectional area of the channel. Thus, the channel may have any suitable cross-sectional shape, for example, circular, oval, triangular, irregular, square, rectangular, quadrilateral, or the like. In some embodiments, the channels are sized so as to allow laminar flow of one or more fluids contained within the channel to occur.

The channel may also have any suitable cross-sectional aspect ratio. The "cross-sectional aspect ratio" is, for the cross-sectional shape of a channel, the largest possible ratio (large to small) of two measurements made orthogonal to each other on the cross-sectional shape. For example, the channel may have a cross-sectional aspect ratio of less than about 2:1, less than about 1.5:1, or in some cases about 1:1 (e.g., for a circular or a square cross-sectional shape). In other embodiments, the cross-sectional aspect ratio may be relatively large. For example, the cross-sectional aspect ratio may be at least about 2:1, at least about 3:1, at least about 4:1, at least about 5:1, at least about 6:1, at least about 7:1, at least about 8:1, at least about 10:1, at least about 12:1, at least about 15:1, or at least about 20:1.

As mentioned, the channels can be arranged in any suitable configuration within the device. Different channel arrangements may be used, for example, to manipulate fluids, droplets, and/or other species within the channels. For example, channels within the device can be arranged to create droplets (e.g., discrete droplets, single emulsions, double emulsions or other multiple emulsions, etc.), to mix fluids and/or droplets or other species contained therein, to screen or sort fluids and/or droplets or other species contained therein, to split or divide fluids and/or droplets, to cause a reaction to occur (e.g., between two fluids, between a species carried by a first fluid and a second fluid, or between two species carried by two fluids to occur), or the like.

Non-limiting examples of systems for manipulating fluids, droplets, and/or other species are discussed below. Additional examples of suitable manipulation systems can also be seen in U.S. patent application Ser. No. 11/246,911, filed Oct. 7, 2005, entitled "Formation and Control of Fluidic Species," by Link, et al., published as U.S. Patent Application Publication No. 2006/0163385 on Jul. 27, 2006; U.S. patent application Ser. No. 11/024,228, filed Dec. 28, 2004, entitled "Method and Apparatus for Fluid Dispersion," by Stone, et al., now U.S. Pat. No. 7,708,949, issued May 4, 2010; U.S. patent application Ser. No. 11/885,306, filed Aug. 29, 2007, entitled "Method and Apparatus for Forming Multiple Emulsions," by Weitz, et al., published as U.S. Patent Application Publication No. 2009/0131543 on May 21, 2009; and U.S. patent application Ser. No. 11/360,845, filed Feb. 23, 2006, entitled "Electronic Control of Fluidic Species," by Link, et al., published as U.S. Patent Application Publication No. 2007/0003442 on Jan. 4, 2007; each of which is incorporated herein by reference in its entirety.

Fluids may be delivered into channels within a device via one or more fluid sources. Any suitable source of fluid can be used, and in some cases, more than one source of fluid is used. For example, a pump, gravity, capillary action, surface tension, electroosmosis, centrifugal forces, etc. may be used to deliver a fluid from a fluid source into one or more channels in the device. A vacuum (e.g., from a vacuum pump or other suitable vacuum source) can also be used in some embodiments. Non-limiting examples of pumps include syringe pumps, peristaltic pumps, pressurized fluid sources, or the like. The device can have any number of fluid sources associated with it, for example, 1, 2, 3, 4, 5, 6, 7, 8, 9, 10, etc., or more fluid sources. The fluid sources need not be used to deliver fluid into the same channel, e.g., a first fluid source can deliver a first fluid to a first channel while a second fluid source can deliver a second fluid to a second channel, etc. In some cases, two or more channels are arranged to intersect at one or more intersections. There may be any number of fluidic channel intersections within the device, for example, 2, 3, 4, 5, 6, etc., or more intersections.

A variety of materials and methods, according to certain aspects of the invention, can be used to form devices or components such as those described herein, e.g., channels such as microfluidic channels, chambers, etc. For example, various devices or components can be formed from solid materials, in which the channels can be formed via micromachining, film deposition processes such as spin coating and chemical vapor deposition, physical vapor deposition, laser fabrication, photolithographic techniques, etching methods including wet chemical or plasma processes, electrodeposition, and the like. See, for example, *Scientific American*, 248:44-55, 1983 (Angell, et al). In one set of embodiments, various structures or components of the devices described herein can be formed of a polymer, for example, an elastomeric polymer such as polydimethylsiloxane ("PDMS"), polytetrafluoroethylene ("PTFE" or Teflon®), or the like. For instance, according to one embodiment, a channel such as a microfluidic channel may be implemented by fabricating the fluidic system separately using PDMS or other soft lithography techniques (details of soft lithography techniques suitable for this embodiment are discussed in the references entitled "Soft Lithography," by Younan Xia and George M. Whitesides, published in the Annual Review of Material Science, 1998, Vol. 28, pages 153-184, and "Soft Lithography in Biology and Biochemistry," by George M. Whitesides, Emanuele Ostuni, Shuichi Takayama, Xingyu Jiang and Donald E. Ingber, published in the Annual Review of Biomedical Engineering, 2001, Vol. 3, pages 335-373; each of these references is incorporated herein by reference).

Other examples of potentially suitable polymers include, but are not limited to, polyethylene terephthalate (PET), polyacrylate, polymethacrylate, polycarbonate, polystyrene, polyethylene, polypropylene, polyvinylchloride, cyclic olefin copolymer (COC), polytetrafluoroethylene, a fluorinated polymer, a silicone such as polydimethylsiloxane, polyvinylidene chloride, bis-benzocyclobutene ("BCB"), a polyimide, a fluorinated derivative of a polyimide, or the like. Combinations, copolymers, or blends involving polymers including those described above are also envisioned. The device may also be formed from composite materials, for example, a composite of a polymer and a semiconductor material.

In some embodiments, various structures or components of the device are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid that can be induced to solidify, or that spontaneously solidifies, into a solid capable of containing and/or transporting fluids contemplated for use in and with the fluidic network. In one embodiment, the hardenable fluid comprises a polymeric liquid or a liquid polymeric precursor (i.e. a "prepolymer"). Suitable polymeric liquids can include, for example, thermoplastic polymers, thermoset polymers, waxes, metals, or mixtures or composites thereof heated above their melting point. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to the invention include those formed from precursors including the chlorosilanes such as methylchlorosilanes, ethylchlorosilanes, phenylchlorosilanes, etc.

Silicone polymers are used in certain embodiments, for example, the silicone elastomer polydimethylsiloxane. Non-limiting examples of PDMS polymers include those sold under the trademark Sylgard by Dow Chemical Co., Midland, Mich., and particularly Sylgard 182, Sylgard 184, and Sylgard 186. Silicone polymers including PDMS have several beneficial properties simplifying fabrication of various structures of the invention. For instance, such materials are inexpensive, readily available, and can be solidified from a prepolymeric liquid via curing with heat. For example, PDMSs are typically curable by exposure of the prepolymeric liquid to temperatures of about, for example, about 65° C. to about 75° C. for exposure times of, for example, at least about an hour. Also, silicone polymers, such as PDMS, can be elastomeric and thus may be useful for forming very small features with relatively high aspect ratios, necessary in certain embodiments of the invention. Flexible (e.g., elastomeric) molds or masters can be advantageous in this regard.

One advantage of forming structures such as microfluidic structures or channels from silicone polymers, such as PDMS, is the ability of such polymers to be oxidized, for example by exposure to an oxygen-containing plasma such as an air plasma, so that the oxidized structures contain, at their surface, chemical groups capable of cross-linking to other oxidized silicone polymer surfaces or to the oxidized surfaces of a variety of other polymeric and non-polymeric materials. Thus, structures can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in the art, for example, in an article entitled "Rapid Prototyping of Microfluidic Systems and Polydimethylsiloxane," Anal. Chem., 70:474-480, 1998 (Duffy et al.), incorporated herein by reference.

Another advantage to forming channels or other structures (or interior, fluid-contacting surfaces) from oxidized silicone polymers is that these surfaces can be much more hydrophilic than the surfaces of typical elastomeric polymers (where a hydrophilic interior surface is desired). Such hydrophilic channel surfaces can thus be more easily filled and wetted with aqueous solutions than can structures comprised of typical, unoxidized elastomeric polymers or other hydrophobic materials.

In some aspects, such devices may be produced using more than one layer or substrate, e.g., more than one layer of PDMS. For instance, devices having channels with multiple heights and/or devices having interfaces positioned such as described herein may be produced using more than one layer or substrate, which may then be assembled or bonded together, e.g., using plasma bonding, to produce the final device. As a specific example, a device as discussed herein may be molded from masters comprising two or more layers of photoresists, e.g., where two PDMS molds are then bonded together by activating the PDMS surfaces using $O_2$ plasma or other suitable techniques. In some embodiments, one or more of the layers may have one or more mating protrusions and/or indentations which are aligned to properly align the layers, e.g., in a lock-and-key fashion. For example, a first layer may have a protrusion (having any suitable shape) and a second layer may have a corresponding indentation which can receive the protrusion, thereby causing the two layers to become properly aligned with respect to each other.

In some aspects, one or more walls or portions of a channel may be coated, e.g., with a coating material, including photoactive coating materials. For example, in some embodiments, each of the microfluidic channels at the common junction may have substantially the same hydrophobicity, although in other embodiments, various channels may have different hydrophobicities. For example a first channel (or set of channels) at a common junction may exhibit a first hydrophobicity, while the other channels may exhibit a second hydrophobicity different from the first hydrophobicity, e.g., exhibiting a hydrophobicity that is greater or less than the first hydrophobicity. Non-limiting examples of systems and methods for coating microfluidic channels, for example, with sol-gel coatings, may be seen in International Patent Application No. PCT/US2009/000850, filed Feb. 11, 2009, entitled "Surfaces, Including Microfluidic Channels, With Controlled Wetting Properties," by Abate, et al., published as WO 2009/120254 on Oct. 1, 2009, and International Patent Application No. PCT/US2008/009477, filed Aug. 7, 2008, entitled "Metal Oxide Coating on Surfaces," by Weitz, et al., published as WO 2009/020633 on Feb. 12, 2009, each incorporated herein by reference in its entirety. Other examples of coatings include polymers, metals, or ceramic coatings, e.g., using techniques known to those of ordinary skill in the art.

As mentioned, in some cases, some or all of the channels may be coated, or otherwise treated such that some or all of the channels, including the inlet and daughter channels, each have substantially the same hydrophilicity. The coating materials can be used in certain instances to control and/or alter the hydrophobicity of the wall of a channel. In some embodiments, a sol-gel is provided that can be formed as a coating on a substrate such as the wall of a channel such as a microfluidic channel. One or more portions of the sol-gel can be reacted to alter its hydrophobicity, in some cases. For example, a portion of the sol-gel may be exposed to light, such as ultraviolet light, which can be used to induce a chemical reaction in the sol-gel that alters its hydrophobicity. The sol-gel may include a photoinitiator which, upon exposure to light, produces radicals. Optionally, the photoinitiator is conjugated to a silane or other material within the sol-gel. The radicals so produced may be used to cause a condensation or polymerization reaction to occur on the surface of the sol-gel, thus altering the hydrophobicity of the surface. In some cases, various portions may be reacted or left unreacted, e.g., by controlling exposure to light (for instance, using a mask).

A variety of definitions are now provided which will aid in understanding various aspects of the invention. Following, and interspersed with these definitions, is further disclosure that will more fully describe the invention.

A "droplet," as used herein, is an isolated portion of a first fluid that is completely surrounded by a second fluid. In some cases, the first fluid and the second fluid are substantially immiscible. It is to be noted that a droplet is not necessarily spherical, but may assume other shapes as well, for example, depending on the external environment. The diameter of a droplet, in a non-spherical droplet, is the diameter of a perfect mathematical sphere having the same volume as the non-spherical droplet. The droplets may be created using any suitable technique, as previously discussed.

As used herein, a "fluid" is given its ordinary meaning, i.e., a liquid or a gas. A fluid cannot maintain a defined shape and will flow during an observable time frame to fill the container in which it is put. Thus, the fluid may have any suitable viscosity that permits flow. If two or more fluids are present, each fluid may be independently selected among essentially any fluids (liquids, gases, and the like) by those of ordinary skill in the art.

Certain embodiments of the present invention provide a plurality of droplets. In some embodiments, the plurality of droplets is formed from a first fluid, and may be substantially surrounded by a second fluid. As used herein, a droplet is "surrounded" by a fluid if a closed loop can be drawn around the droplet through only the fluid. A droplet is "completely surrounded" if closed loops going through only the fluid can be drawn around the droplet regardless of direction. A droplet is "substantially surrounded" if the loops going through only the fluid can be drawn around the droplet depending on the direction (e.g., in some cases, a loop around the droplet will comprise mostly of the fluid by may also comprise a second fluid, or a second droplet, etc.).

In most, but not all embodiments, the droplets and the fluid containing the droplets are substantially immiscible. In some cases, however, they may be miscible. In some cases, a hydrophilic liquid may be suspended in a hydrophobic liquid, a hydrophobic liquid may be suspended in a hydrophilic liquid, a gas bubble may be suspended in a liquid, etc. Typically, a hydrophobic liquid and a hydrophilic liquid are substantially immiscible with respect to each other, where the hydrophilic liquid has a greater affinity to water than does the hydrophobic liquid. Examples of hydrophilic liquids include, but are not limited to, water and other aqueous solutions comprising water, such as cell or biological media, ethanol, salt solutions, etc. Examples of hydrophobic liquids include, but are not limited to, oils such as hydrocarbons, silicon oils, fluorocarbon oils, organic solvents etc. In some cases, two fluids can be selected to be substantially immiscible within the time frame of formation of a stream of fluids. Those of ordinary skill in the art can select suitable substantially miscible or substantially immiscible fluids, using contact angle measurements or the like, to carry out the techniques of the invention.

The following documents are incorporated herein by reference in their entireties: International Patent Application No. PCT/US04/10903, filed Apr. 9, 2004, entitled "Formation and Control of Fluidic Species," by Link, et al., published as WO 2004/091763 on Oct. 28, 2004; International Patent Application No. PCT/US03/20542, filed Jun. 30, 2003, entitled "Method and Apparatus for Fluid Dispersion," by Stone, et al., published as WO 2004/002627 on Jan. 8, 2004; International Patent Application No. PCT/US04/27912, filed Aug. 27, 2004, entitled "Electronic Control of Fluidic Species," by Link, et al., published as WO 2005/021151 on Mar. 10, 2005; International Patent Application No. PCT/US2007/002063, filed Jan. 24, 2007, entitled "Fluidic Droplet Coalescence," by Ahn, et al., published as WO 2007/089541 on Aug. 9, 2007; and U.S. Pat. No. 8,337,778. Also incorporated herein by reference in its entirety is U.S. Provisional Patent Application Ser. No. 61/835,381, filed Jun. 14, 2013, entitled "Coalescence of Droplets," by Kodger, et al. The following examples are intended to illustrate certain embodiments of the present invention, but do not exemplify the full scope of the invention.

Example 1

In these examples, the mechanism by which the addition of a fluorinated alcohol destabilizes a surfactant-stabilized water-in-fluorocarbon oil emulsion is discussed. Bulk static and dynamic measurements of the interfacial tension characterize the absorption and cooperativity of the fluid system. Other examples illustrate the design and operation of a microfluidic device that controllably coalesces pairs of droplets via introduction of the fluoroalcohol. The coalescence process is confined to a prescribed region of the fluidic channel where a fluoroalcohol is locally introduced, droplets are merged and diluted in the alcohol, e.g., to restabilize the droplets. Additional surfactant may be provided to restabilize coalesced drops. Additionally, the fluid flow can be imaged with particle tracers to visualize the complex gradients in interfacial tension during the coalescence process. Coalescing, or merging drops, allows sensitive reactions such as antibody staining, cell lysing, and DNA/RNA amplification to be carried out at a rapid pace on singly addressable droplets, etc.

Microfluidic coalescing channels were fabricated in poly (dimethylsiloxane) (PDMS) via standard soft lithography. Fluidic channel molds were fabricated via photolithography of SU-8 photoresist (Microchem) on a silicon wafer. The channels were fabricated to be 25 micrometers high with an additional 8 micrometer high guiding "attic," as discussed below. Sylgard 184 (Dow Corning) PDMS was mixed 10:1 base:curing agents, and was cured over the finished molds at 65° C. for 18 hours. After curing, the PDMS was removed from the mold, fluid tubing via holes were punched with a biopsy punch, and the PDMS bonded to glass using oxygen plasma treatment. To render the sealed microfluidic channels fluorophillic, Aquapel (Ryder Fleet Products) was flowed through the channels for 30 seconds, then flushed out with Novec HFE-7500 (3M).

The microfluidic experiments were imaged on a Nikon Eclipse Ti-S inverted microscope using either a Fastec HiSpec 1 (Fastec Imaging) or Phantom v7.3 (Vision Research) fast camera. Fluid control was provided by KDS 910 OEM syringe pumps (KD Scientific) driving 1 mL and 3 mL syringes. Fluorescence characterization experiments were performed on a Leica SP5 inverted confocal fluorescence microscope.

Unless noted otherwise, the dispersed phase for all experiments described in these examples was DI water. The continuous phase was Novec HFE-7500 containing 2 wt % PFPE-PEG-PFPE triblock copolymer surfactant. 2,2,3,3,4,4,4-Heptafluoro-1-butanol (Oakwood Products) was used as the perfused phase to induce coalescence. 1H,1H,2H,2H-Perfluoro-1-octanol (Sigma Aldrich) and Novec HFE-7500 (3M) were used as perfusion phase negative controls.

Prior to performing a droplet coalescing experiment, a reinjected droplet population was formed in a flow-focusing geometry microfluidic channel with a droplet nozzle cross-section of 15 micrometers×15 micrometers. Flowrates were 180 microliters/hr and 100 microliters/hr for the continuous and dispersed phases, respectively. Droplets were collected into a 1 mL plastic syringe.

Droplet coalescence experiments were performed with the following flowrates: 15 microliters/hr reinjected droplets, 150 microliters/hr reinjected droplet spacing oil, 40 microliters/hr droplet-forming phase, 300 microliters/hr continuous phase, 10 microliters/hr perfused destabilizing phase, and 500 microliters/hr restabilizing oil.

Experiment startup for the droplet coalescing device used in these examples was performed in the following sequence: 1) install syringes in pumps and bleed all tubing lines; 2) connect all HFE-7500-based oil phases and flow at 100 microliters/hr for 5 minutes to expel all air and any contaminants from the microfluidic channels; 3) set oil flows to their proper values for the experiment and allow to equilibrate for 3 minutes; 4) connect reinjection droplets and ensure droplets are flowing into the microfluidic channels; 5) connect dispersed phase to form second droplet population on-chip and check that droplets are formed correctly; 6) connect destabilizing and restabilizing fluids and check for proper flow.

Surface tension measurements were performed on two instruments: equilibrium measurements were measured on a KSV Sigma 701 tensiometer (Biolin Scientific) with a perfluoro-silanized platinum DuNouy ring; dynamic and equilibrium measurements were taken using a custom pendant drop instrument. The custom pendant drop setup captures digital images using a Sony XCD-V60 Firewire camera and determines surface tension values using a curve fitting route in Matlab. Values from this pendant drop instrument were verified against values calculated by a KSV CAM 200 pendant drop surface tension meter (Biolin Scientific).

Adhesion measurements were performed in droplet imaging chambers fabricated in the following manner: No. 1 glass coverslips were spin-coated with PDMS and cured as noted above for PDMS molds. 1 mm thick glass spacers were inserted between a standard microscope slide and the inverted coverslip. After assembly, the device was coated with Aquapel, dried with compressed air, and then soaked for 5 minutes in a solution of 2 wt % PFPE-PEG-PFPE in HFE-7500. The chamber was removed from the surfactant solution, dried with compressed air, and all but one side sealed using 5 minute epoxy. Once the epoxy cured, the chamber was filled with the appropriate test solution and droplets were pipetted into the test solution using a gel-loading pipette tip.

Adhesion was quantified using simultaneous fluorescence and reflection upright confocal microscopy. At the PDMS coverslip interface, a circular adhesive "patch" appeared dark in reflection confocal microscopy due to physical contact between the droplet and the PDMS. Confocal fluorescence microscopy was used to determine the radius of the droplet. Measuring the radius of the contact patch and the radius of the droplet allowed the contact angle between the droplet and PDMS to be calculated. Using this contact angle and measured bulk surface tensions, the energy of adhesive as a function of alcohol concentration could be determined.

Example 2

Figure 1A:
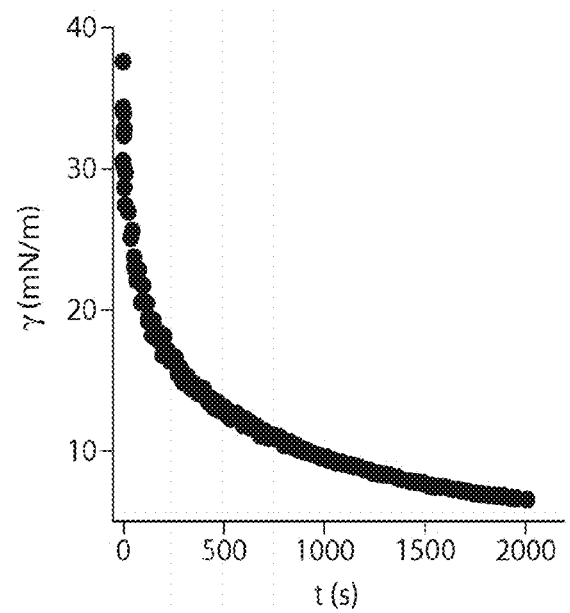
FIGS. 1A-1B illustrate interfacial evolution measurements, in one embodiment of the invention.
Figure 1B:
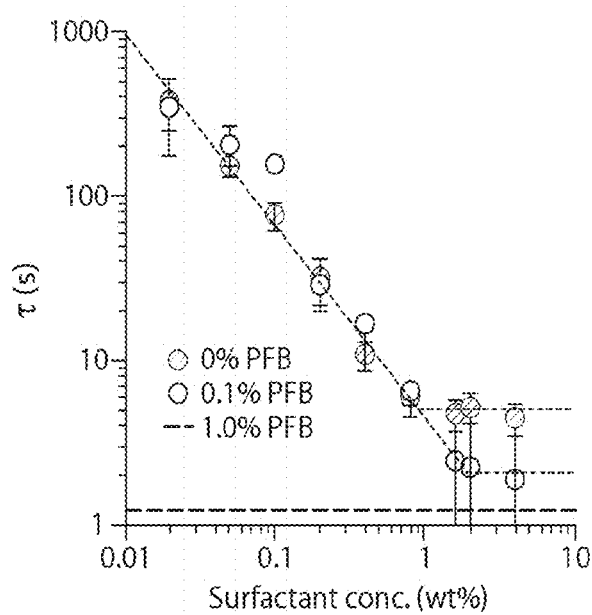

To first understand and characterize the interfaces of the water-in-oil emulsion system, interfacial tensions and characteristic time scales were measured for local solution conditions encountered in the microfluidic system. FIG. 1 shows characteristic time constants of interfacial tension evolution. The critical micelle concentration (CMC) was identified as the concentration at which the time constant reaches a plateau value. Kinetic interfacial tension was measured using the pendant drop method (FIG. 1A). Simple exponentials were fit to the interfacial tension with time curves and a time constant extracted from the fit; timescales for surfactant stabilization of the interface are plotted as a function of surfactant concentration in the oil phase (FIG. 1B).

The triblock surfactant decreased the water-fluorocarbon interfacial tension so low that droplets eventually pinched off from the pendant drop needle under their own buoyancy; this occurred for interfacial tension values of approximately 2 mN/m. Interfacial tensions were measured up to this point in time. It could be seen that the time constant decreased monotonically with increasing surfactant concentration until a critical value is reached, at which point the time constant remained constant with continued increases in surfactant concentration. This concentration was the critical micelle concentration (CMC) and denotes the point at which recruitment of surfactant to the interface is no longer limited by diffusion of individual surfactant molecules through the bulk; for this solvent system, the CMC was approximately 0.7 wt %. For all microfluidic experiments, a surfactant concentration roughly 2.5× more concentrated than the CMC was used.

Adding 0.1 vol % of heptafluorobutanol (PFB) to the bulk phase had no effect on the kinetics at low surfactant concentrations. However, at higher surfactant concentration, it was observed that the presence of these low amounts of the fluorobutanol increased the CMC of the surfactant and decreased the characteristic timescale for stabilization. At concentrations of PFB at or above 1%, the droplet was stabilized as soon as it was created in the pendant drop cuvette, and no temporal evolution of the interfacial tension was observed.

Example 3

Figure 2:
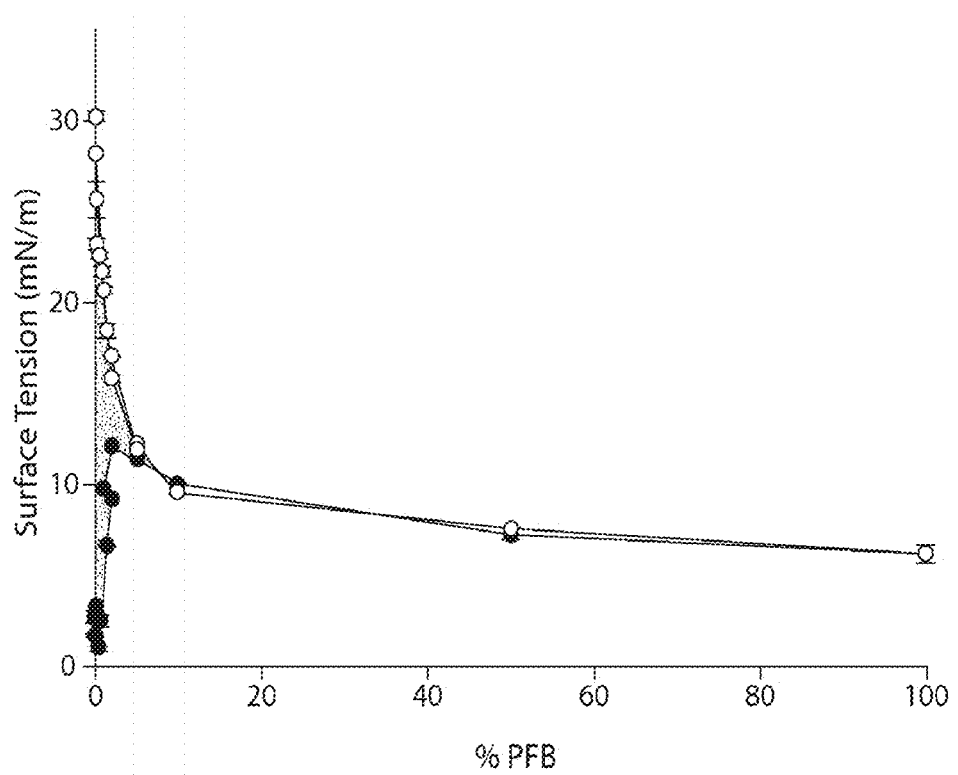
FIG. 2 illustrates equilibrium surface tension measurements, in another embodiment of the invention.

The equilibrium interfacial tensions of this water-in-oil system was also characterized. It was observed that in the absence of surfactant, fluorobutanol caused a significant decrease in the water-oil interfacial tension. The addition of the triblock surfactant produced an even larger decrease in the interfacial tension. The competition between the triblock and the PFB resulted in an interesting evolution of the interfacial tension as PFB concentration increased (FIG. 2). For PFB concentrations below 1 vol %, the interfacial tension remained nearly constant at the value for pure HFE-7500 with 2 wt % surfactant. Above 1 vol %, fluorobutanol caused an increase in the interfacial tension, until the surfactant-laden curve intersects the surfactant-free curve near a PFB concentration of 10 vol %. Above 10 vol % PFB, data points for the surfactant-laden and surfactant-free curves lie on top of one another. This suggests that the triblock surfactant is no longer the primary molecule stabilizing the interface, which agrees with the kinetic observations, above.

FIG. 2 shows equilibrium surface tension for water-in-oil emulsions. The continuous phase was HFE-7500 fluorocarbon oil with varying amounts of heptafluorobutanol (PFB). White circles corresponded to surfactant-free measurements. Black circles corresponded to measurements performed with 2 wt % PFPE-PEG-PFPE surfactant present in the continuous phase. Shaded region indicated PFB concentrations where the surfactant still dominates the equilibrium interfacial tension.

Figure 3:
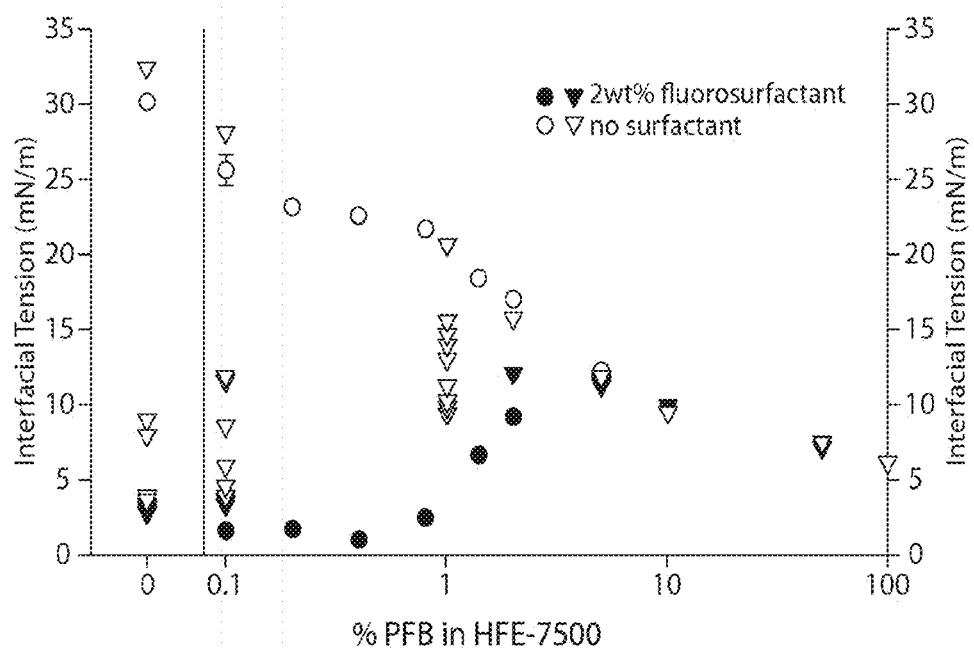
FIG. 3 illustrates additional equilibrium interfacial tension measurements, in yet another embodiment of the invention.

To verify the trends observed for 0 and 2 wt % surfactant, additional measurements of interfacial tension were performed using intermediate surfactant concentrations at three PFB concentrations. These points are plotted as gray triangles in FIG. 3. The gray level indicates relative surfactant concentration: darker triangles correspond to surfactant concentrations closer to 2 wt %. As expected, the interfacial tensions for these samples lie between the surfactant-free and 2 wt % bounding curves (FIG. 3). Equilibrium interfacial tension values were also measured with a Du Nouy ring tensiometer and plotted as the circular data points in FIG. 3. These values match the trends of those measured by pendant drop and indicated no bias in the data introduced by this measurement technique.

FIG. 3 shows additional equilibrium interfacial tension measurements. Data points plotted as circles were measured on a Du Nouy ring instrument. Data points plotted as triangles were measured in a pendant drop instrument. White data points corresponded to surfactant-free experiments, while black data points corresponded to experiments performed with 2 wt % PFPE-PEG-PFPE surfactant in the continuous phase. Gray triangles represent measurements corresponding to surfactant concentrations between 0 and 2 wt %.

Example 4

Figure 4B:
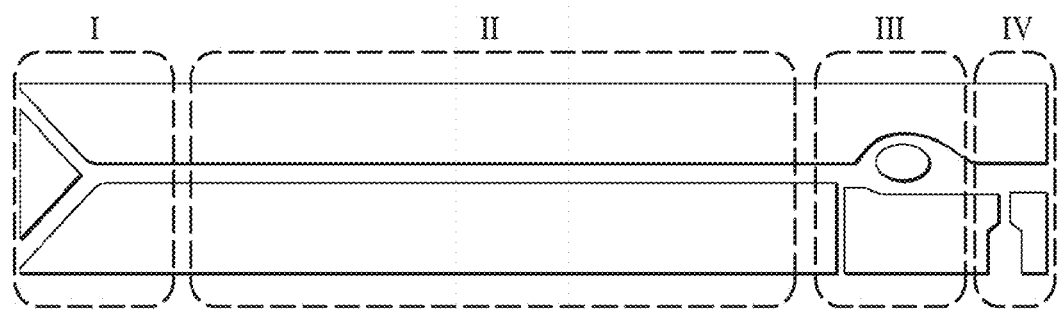

From these experiments, it was observed that the addition of fluorinated alcohol sensitized the surfactant-coated droplet interface and prepared conditions favorable for coalescence. It was hypothesized that addition of the alcohol using a microfluidic device would allow controlled coalescence of paired droplets. Three operations are used to ensure robust, controlled coalescence of aqueous droplets via destabilization with a fluorinated alcohol. The device geometry to achieve these three operations is shown in FIGS. 4B. First, the droplets were paired together (Region I) and moved to the wall of the channel nearest the point where fluorinated alcohol was introduced (Region II). Second, a fluorinated alcohol (e.g., fluorobutanol) was brought into contact with the droplets without disturbing the droplet pairing (Region III). Lastly, the droplets were restabilized following coalescence for collection further sample processing (Region IV), e.g., using fresh fluorocarbon oil and surfactant to restabilize droplets.

Figure 5A:
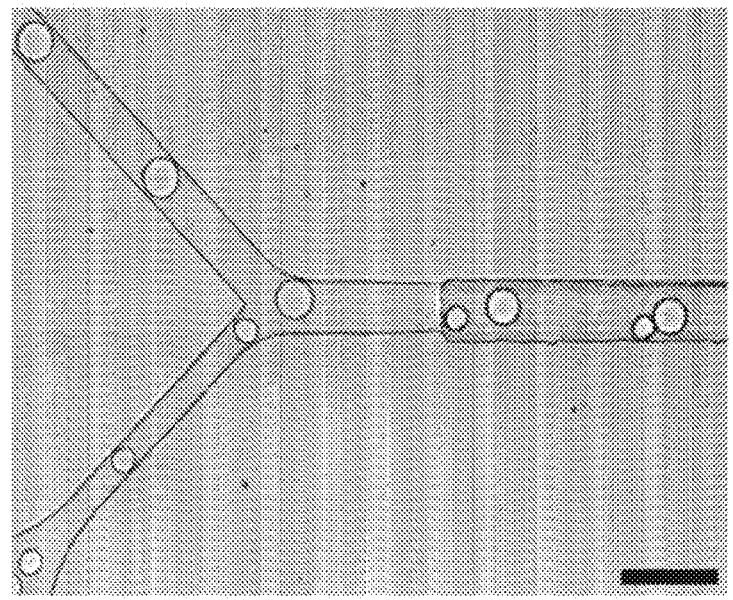
FIGS. 5A-5F illustrate droplet pairing and control, in accordance with certain embodiments of the invention.
Figure 5B:
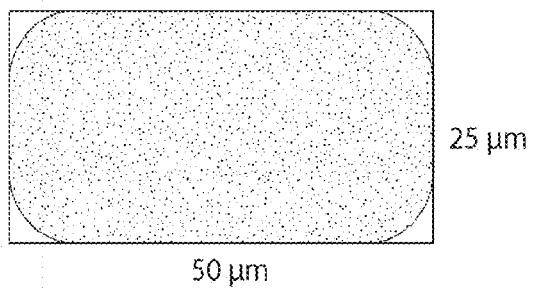
Figure 5C:
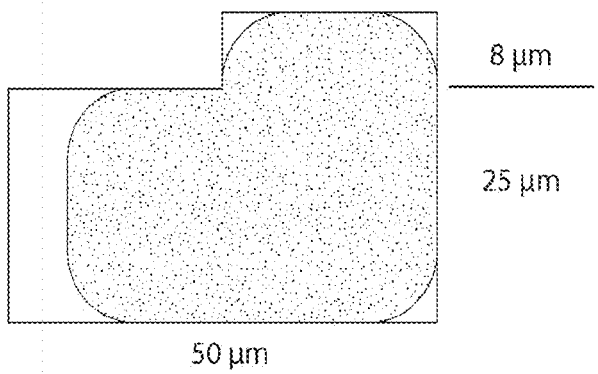
Figure 5D:
Figure 5E:

To pair droplets together in Region I in FIG. 4B, a Y-channel design was employed that flowed both droplets species together (FIG. 5A). From the lower arm of the Y, a pre-made population of droplets with diameter ~25 micrometers was injected. From the upper arm of the Y, droplets having a diameter of ~40 micrometers were formed. In this example, forming one droplet population on-chip and reinjecting the other allowed for the tuning of the droplet production frequency to the droplet reinjection rate and thus the two droplet streams could be synchronized, although other methods are also possible. Here, once synchronized, each droplet pair flowed down the leg of the Y where the smaller droplets "catch" the larger droplets, as the smaller droplets sample less of the flow profile and thus experiences a higher average velocity. (See, e.g., International Patent Application No. PCT/US2007/002063, filed Jan. 24, 2007, entitled "Fluidic Droplet Coalescence," by Ahn, et al., published as WO 2007/089541 on Aug. 9, 2007, incorporated herein by reference in its entirety).

In some experiments, lower efficiencies of droplet coalescence were observed if droplets were not in contact with the lower sidewall of the channel where the destabilizing phase is introduced, although coalescence still occurred. However, in some experiments, to steer the droplets to the lower channel wall, a tapering attic or groove feature was introduced in the leg of the Y, as shown in FIGS. 5B-5E. Since the water droplets were buoyant relative to the fluorocarbon oil, the water droplets generally floated to the top of the microfluidic channel and at least partially entered this attic region. The width of the attic decreased as the droplets flowed downstream, forcing the water droplets towards the lower wall of the channel. It is at this wall of the channel that fluorobutanol was introduced.

Figure 5F:
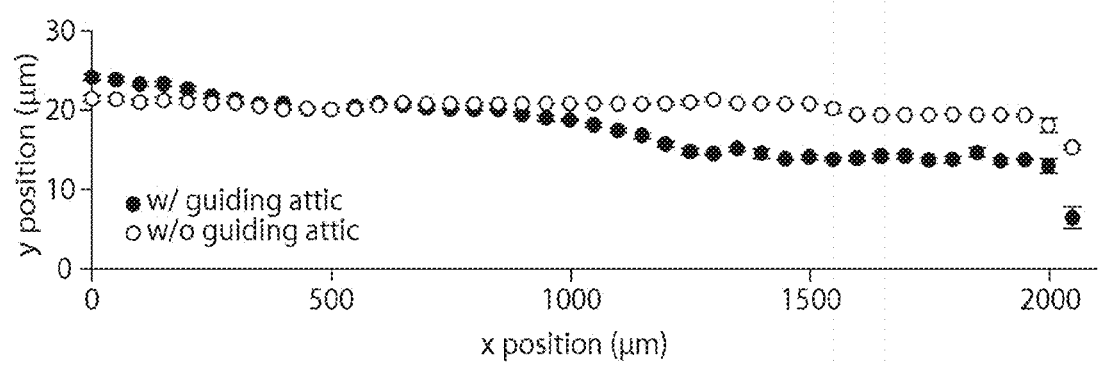

To characterize the guiding effectiveness of the tapered attic feature, the droplets as they flowed down the leg of Y were tracked in some experiments. The average position of droplet centers was plotted as a function of distance along the channel in FIG. 5F. Also plotted is the average position of droplets in the absence of the attic feature, in some embodiments. These plots confirm that the attic feature steers droplets to the lower wall of the channel. With the attic channel missing, droplets are located much closer to the center of the channel at the point they encounter the PFB stream.

FIG. 5 illustrates droplet pairing. FIG. 5A shows proper pairing of one small and one large droplet. FIG. 5B is a cross-section of a normal channel in Region II. FIG. 5C is a cross-section of a channel with a guiding attic in Region II. FIG. 5D is an overhead view of a normal channel in Region II with cross-section (b) indicated. FIG. 5E is an overhead view of channel with a guiding attic in Region II with cross-section (c) indicated. FIG. 5F shows the measured positions of droplet centers with and without guiding attic.

At the point of fluorobutanol introduction in Region III, the droplet pairs contacted the stream of PFB, passed through a slight constriction, and coalesced with one another. Following exposure to the PFB stream, the droplets encountered a fresh stream of pure HFE-7500 containing additional triblock surfactant in Region IV, which thereby allowed the collection of stable coalesced droplets. The additional flow increased the continuous phase velocity and causes droplets to accelerate away from each other, ensuring that the droplets were separated by oil. The flow also diluted the concentration of PFB in the oil, giving a final concentration of ~1 vol % PFB in the collected emulsion.

Example 5

Figure 12:
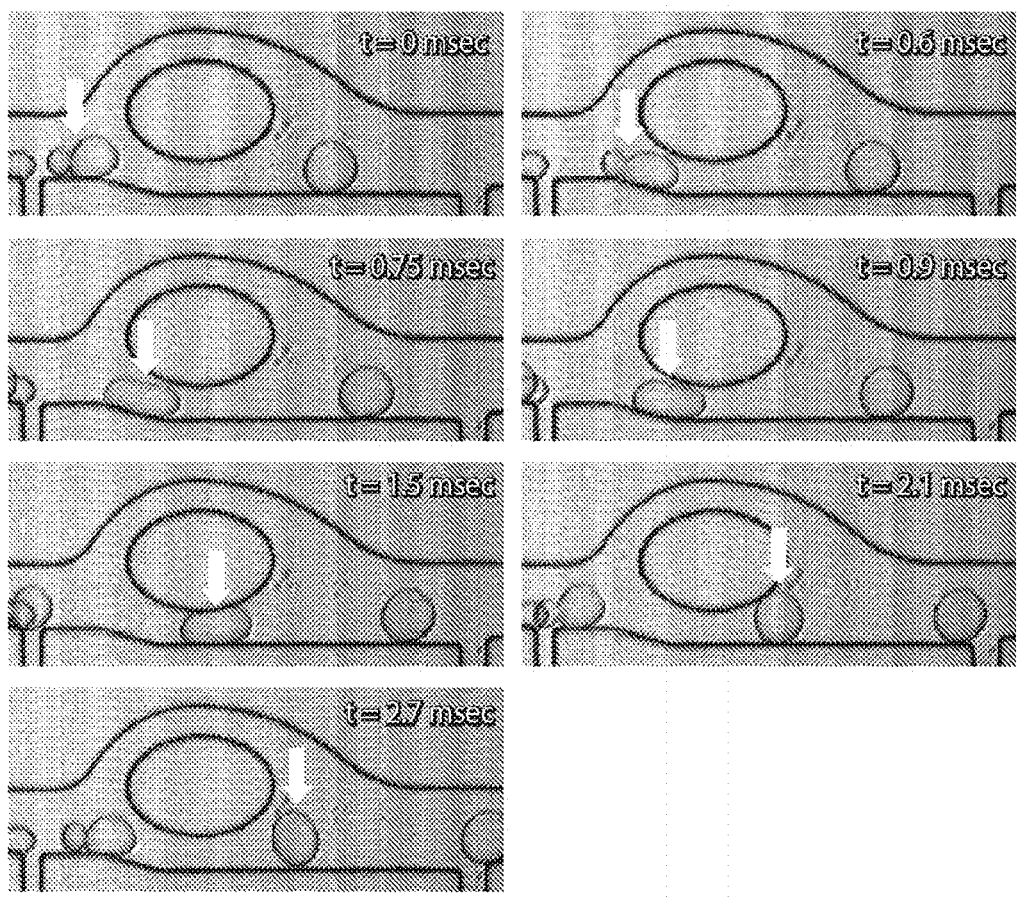
FIG. 12 is a time sequence of two droplets merging together, in still another embodiment of the invention.

This example illustrates imaging of the coalescence event with a high speed camera to capture the dynamics of the droplet interactions. This can be seen in FIG. 12 (one pair of droplets identified with an arrow). As the large droplet exits the end of the attic feature, it enters the vicinity of the PFB stream. Once the thin oil shell surrounding the droplet drains away, the PFB contacts the droplet interface and within 3 msec wets the entire interface, pulling the droplet into contact with the PFB and channel wall. The second, smaller droplet follows and becomes stuck to the first droplet. After passing through the constriction, the droplets merge and then encounter the surfactant-rich restabilizing oil.

Example 6

To characterize the coalescence efficiency of this microfluidic device, this example illustrates a fluorescence assay of the coalesced droplets. A pre-made population of 25 micrometer diameter droplets containing a solution of 0.5 mg/ml RITC-dextran (Mw=70 kDa) in water was prepared. 40 micrometer droplets made on-chip contain 0.5 mg/ml FITC-dextran (Mw=70 kDa) in water. Thus, the small droplets would appear red when imaged with a fluorescence microscope, while the larger droplets would appear green, as shown in the schematic of FIG. 6.

Imaging the collected emulsion in a fluorescence confocal microscope allows the quantification of the efficiency of coalescence by simultaneously measuring the fluorescence intensity in two detection channels, namely green and red. Uncoalesced droplets would contain only red or green fluorescence, while coalesced droplets would contain both. Droplet diameters could also be measured to characterize multiple coalescence events.

Figure 7A:
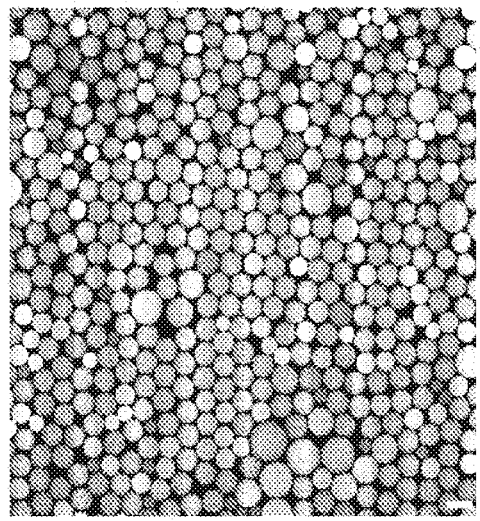
FIGS. 7A-7B illustrate a comparison of droplets merged using various techniques.
Figure 7B:
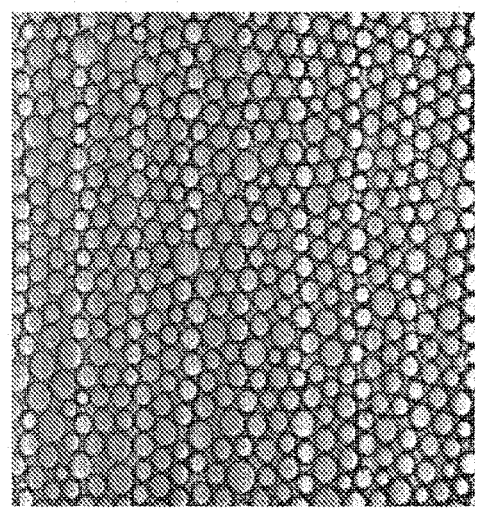

The emulsion collected downstream of the coalescence device was found to be very stable, as seen in FIG. 7. A majority of collected droplets appeared yellow when observed using the fluorescence confocal microscope, corresponding to the presence of both red and green fluorescent dyes. The emulsion (FIG. 7A) shows some polydispersity and multiple merging events, and was observed to be similar to that produced by an electrocoalescence device such as is disclosed in International Patent Application No. PCT/US2004/010903, filed Apr. 9, 2004, entitled "Formation and Control of Fluidic Species," by Link, et al., published as WO 2004/091763 on Oct. 28, 2004 (incorporated herein by reference) (FIG. 7B). Scale bar in FIG. 7 represents 50 micrometers.

Figure 8:
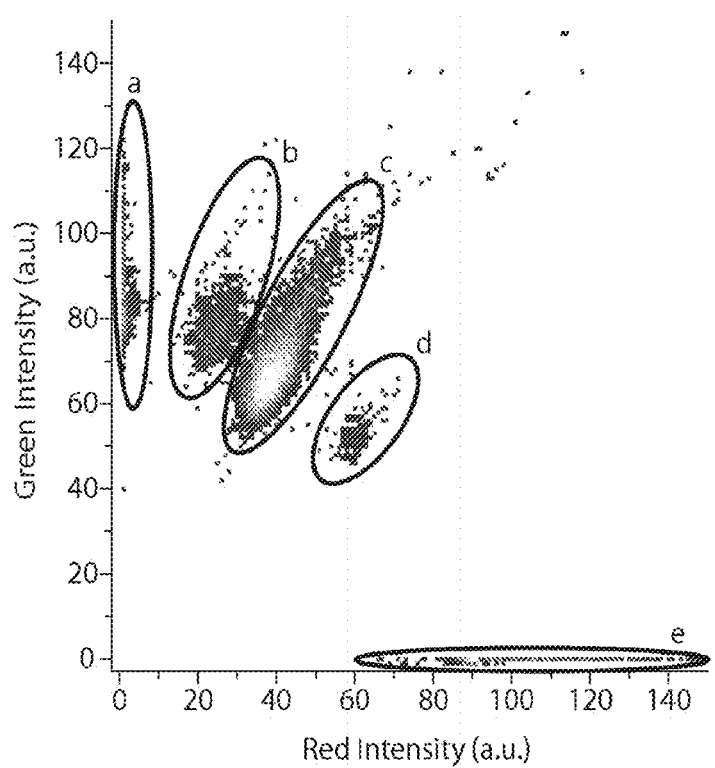
FIG. 8 is a two-dimensional histogram of coalesced droplets.
Figure 9A:
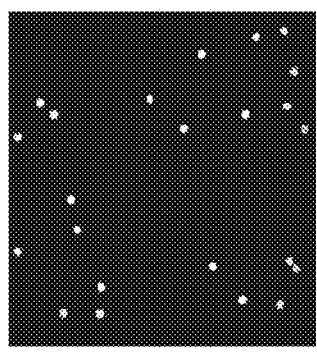
FIGS. 9A-9F illustrate coalesced droplet subpopulations, produced according to certain embodiments of the invention.
Figure 9B:
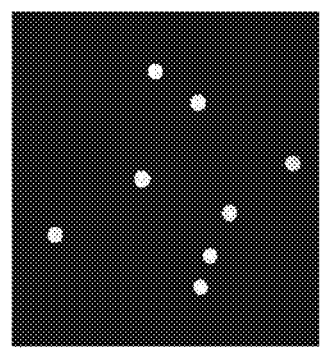
Figure 9C:
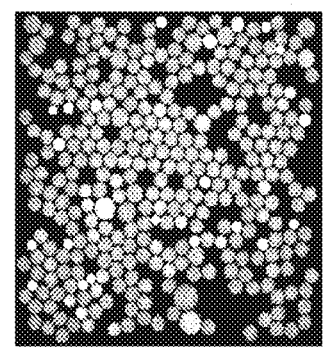
Figure 9D:
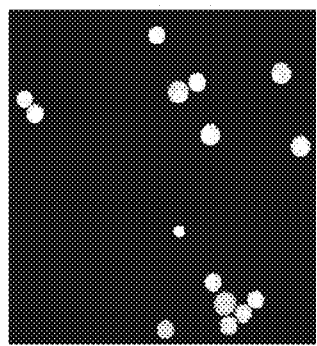
Figure 9E:
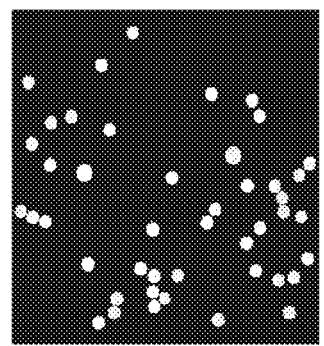
Figure 9F:
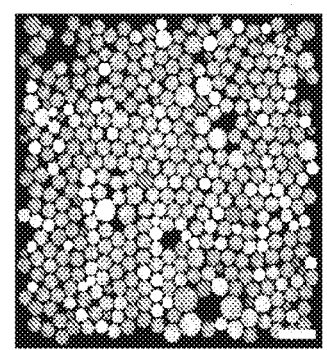

Following analysis of many fluorescence images similar to the example shown in FIG. 7, a two-dimensional histogram of the fluorescence intensities of the droplets was constructed. Red fluorescence intensity was plotted on the x-axis and green fluorescence intensity on the y-axis, as shown in FIG. 8. From this plot, it is apparent that there were five subpopulations contained within the analyzed droplets in this example, labeled (a)-(e). Histograms are shown as log(n). In this plot, N=15384.

To determine which droplets from FIG. 7 corresponded to each subpopulation in the histogram of FIG. 8, each subpopulation on the histogram was selected in turn and an image generated of the droplets from FIG. 7 that lied within the population. These five images are displayed as the panels in FIG. 9. The five subpopulations corresponded to the following merged droplet ratios, expressed as [green]:[red]: a) 1:0, b) 2:1, c) 1:1, d) 1:2, and e) 0:1. Table 1 shows the size of each subpopulation as a percentage of the total population. The subpopulation display and size characterization established that the desired droplet merging ratio of one red to one green is the dominant coalescence event occurring within this microfluidic device.

TABLE 1

| Subpopulation | Percentage of Total Population |
| --- | --- |
| a | 6% |
| b | 2% |
| c | 66% |
| d | 10% |
| e | 6% |
| other | 10% |

Example 7

Figure 10:
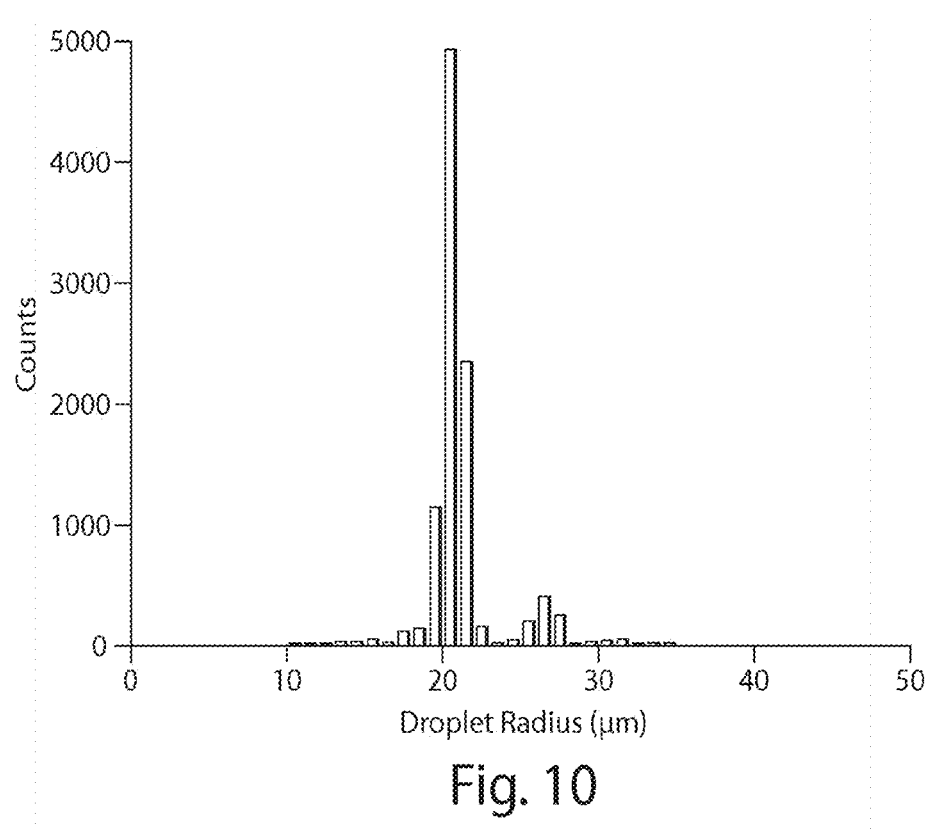
FIG. 10 is a histogram of droplets, in another embodiment of the invention.

In this example, the parameter characterized was the size distribution of the collected droplets, using the above-described microfluidic devices. Droplets were selected corresponding to subpopulation (c), and the radius of each droplet within the subpopulation was determined. The histogram of these radii is shown in FIG. 10. A dominant peak was observed at a radius of 21 micrometers, corresponding to a diameter of 42 micrometers, which is expected for the radius of a single 40 micrometer droplet merged with a single 25 micrometer droplet. Thus, it can be concluded that this coalescence device produces 1:1 droplet coalescence.

Example 8

Figure 11A:
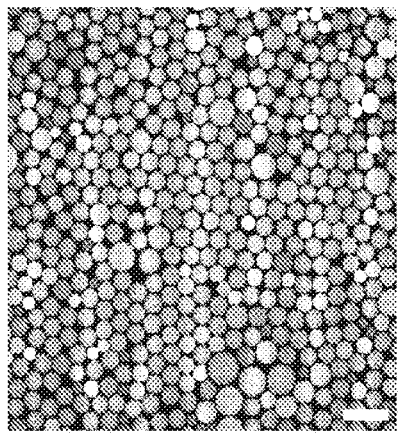
FIGS. 11A-11F illustrate droplet stability, in yet another embodiment of the invention.
Figure 11B:
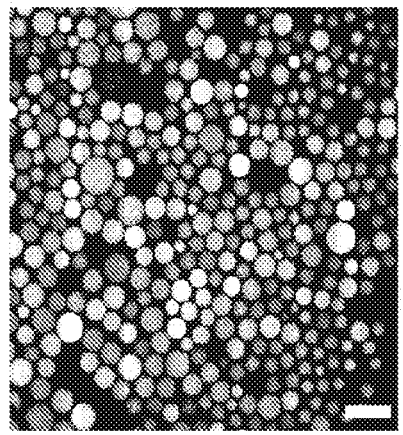
Figure 11C:
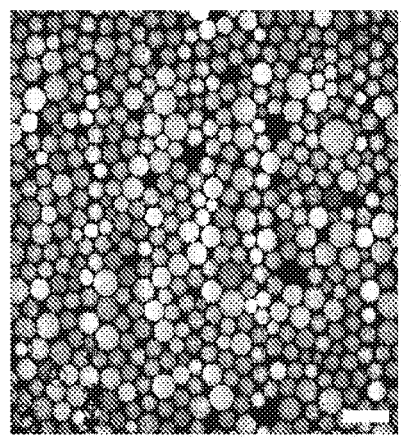
Figure 11D:
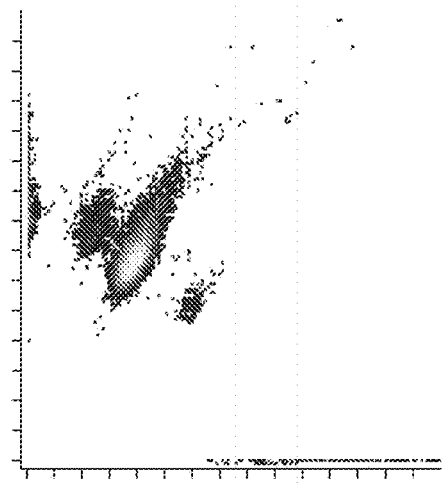
Figure 11E:
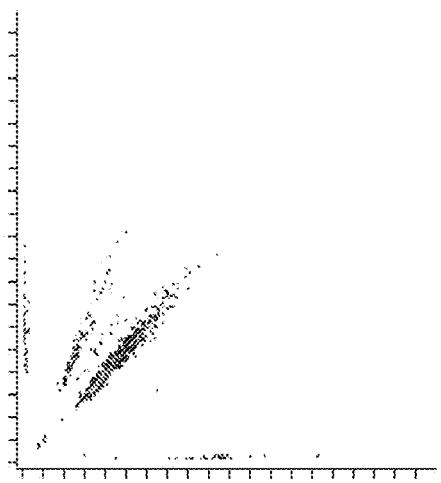
Figure 11F:
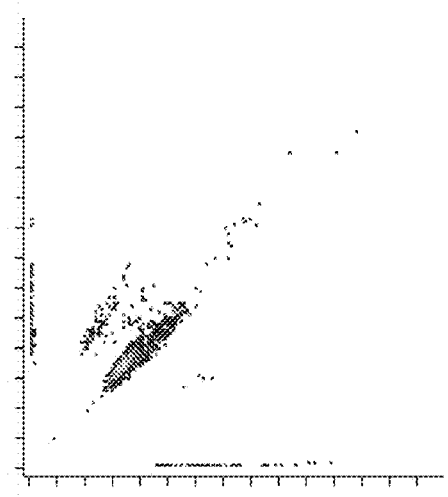

Though samples collected and imaged immediately after coalescence appeared stable against additional coalescence, the following example illustrates stability over hours, if not days. In this example, the droplets collected for color analysis were kept in vials for an additional three days and samples were removed at 24 and 74 hours. Images and two-color histograms of the three time points are shown in FIG. 11. It was observed that the droplets remained stable over the course of 72 hours and the same five color ratio populations existed at all timepoints. Differences in the slopes and appearance of the subpopulations between FIGS. 11D-11F were due to slight differences in the fluorescence imaging parameters, including the confocal fluorescence microscope used, laser power, wavelength band recorded, and detector gain. The top row of images were fluorescence images collected at the following time points: FIG. 11A, 0 hours after paired coalescence, N=15384; FIG. 11B, 24 hours after paired coalescence, N=2457; and FIG. 5C, 72 hours after paired coalescence, N=2496.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
flowing a first fluidic droplet and a second fluidic droplet in a liquid within a microfluidic channel, the first fluidic droplet and the second fluidic droplet each stabilized in the liquid using a surfactant, wherein the first fluidic droplet and the second fluidic droplet are each controlled within the microfluidic channel using a groove in a wall of the microfluidic channel, wherein said groove steers said first and second fluidic droplets to a lower area of said wall;
exposing the first fluidic droplet and/or the second fluidic droplet to a solvent able to alter interfacial tension of the surfactant, wherein said solvent at least partially dissolves said surfactant; and
causing the first fluidic droplet and the second fluidic droplet to merge into a combined droplet without using electric fields or charges,
wherein the first fluidic droplet and/or the second fluidic droplet are altered or disrupted when exposing the droplets to the solvent, wherein the amount of disruption is controlled.

2. The method of claim 1, wherein causing the first fluidic droplet and the second fluidic droplet to merge comprises physically disrupting the first fluidic droplet and/or the second fluidic droplet.

3. The method of claim 1, wherein causing the first fluidic droplet and the second fluidic droplet to merge comprises altering flow of the first fluidic droplet and/or the second fluidic droplet within the microfluidic channel.

4. The method of claim 1, wherein causing the first fluidic droplet and the second fluidic droplet to merge comprises contacting the first fluidic droplet with the second fluidic droplet.

5. The method of claim 1, wherein causing the first fluidic droplet and the second fluidic droplet to merge comprises causing the first fluidic droplet and/or the second fluidic droplet to encounter an obstruction within the microfluidic channel.

6. The method of claim 1, comprising causing the first fluidic droplet and the second fluidic droplet to merge into a combined droplet without creating an electrical charge on first fluidic droplet or the second fluidic droplet.

7. The method of claim 1, further comprising causing the first fluidic droplet and the second fluidic droplet to contact a wall of the microfluidic channel.

8. The method of claim 7, wherein the first fluidic droplet and the second fluidic droplet contact the wall of the microfluidic channel prior to exposing the first fluidic droplet and/or the second fluidic droplet to the solvent.

9. The method of claim 1, further comprising diluting the solvent after causing the first fluidic droplet and the second fluidic droplet to merge.

10. The method of claim 1, further comprising applying the surfactant to the combined droplet after causing the first fluidic droplet and the second fluidic droplet to merge into the combined droplet.

11. The method of claim 1, further comprising applying a second surfactant to the combined droplet after causing the first fluidic droplet and the second fluidic droplet to merge into the combined droplet.

12. The method of claim 1, wherein the solvent alters interfacial tension of the surfactant by at least about 10 mN/m.

13. The method of claim 1, wherein the solvent and the surfactant are substantially miscible at a first weight ratio and precipitate at a second weight ratio.

14. The method of claim 1, comprising flowing a plurality of first fluidic droplets and a second plurality of fluidic droplets and causing the first fluidic droplets and the second fluidic droplets to merge.

15. The method of claim 1, wherein the first fluidic droplet has a volume no more than about 10 times bigger than a volume of the second fluidic droplet.

16. A method, comprising:
    flowing a first fluidic droplet and a second fluidic droplet in a liquid in a microfluidic channel, the microfluidic channel containing a groove defined in a wall of the microfluidic channel, the groove having a cross-sectional area that decreases in a downstream direction of the microfluidic channel, wherein a size difference of the cross section areas is at least about 5%; and
    causing the first fluidic droplet and the second fluidic droplet to move towards a wall of the microfluidic channel via interaction of the respective fluidic droplet with the groove;
    exposing the first fluidic droplet and/or the second fluidic droplet to a solvent able to alter interfacial tension of the surfactant, wherein said solvent at least partially dissolves said surfactant; and
    causing the first fluidic droplet and the second fluidic droplet to merge into a combined droplet.

17. The method of claim 16, wherein upon entrance of the first or second droplets into the groove, the droplets change velocity within the channel.

18. The method of claim 16, further comprising flowing a second fluidic droplet within the microfluidic channel.

19. The method of claim 18, wherein the fluidic droplet and the second fluidic droplet are brought into contact with each other upon interaction of at least one of the fluidic droplet and the second fluidic droplet with the groove.

\* \* \* \* \*